United States Patent
Park et al.

(10) Patent No.: US 12,289,611 B2
(45) Date of Patent: Apr. 29, 2025

(54) BEAM MANAGEMENT FOR RADIO FREQUENCY SENSING

(71) Applicant: QUALCOMM Incorporated, San Diego, CA (US)

(72) Inventors: Sungwoo Park, Seoul (KR); Wooseok Nam, San Diego, CA (US); Tao Luo, San Diego, CA (US); Junyi Li, Fairless Hills, PA (US); Juan Montojo, San Diego, CA (US); Jing Sun, San Diego, CA (US); Xiaoxia Zhang, San Diego, CA (US); Peter Gaal, San Diego, CA (US); Taesang Yoo, San Diego, CA (US); Simone Merlin, San Diego, CA (US); Srinivas Yerramalli, Hyderabad (IN); John Edward Smee, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 526 days.

(21) Appl. No.: 17/377,237

(22) Filed: Jul. 15, 2021

(65) Prior Publication Data

US 2022/0030440 A1 Jan. 27, 2022

Related U.S. Application Data

(60) Provisional application No. 63/056,357, filed on Jul. 24, 2020, provisional application No. 63/056,449, filed on Jul. 24, 2020.

(51) Int. Cl.
| | | |
|---|---|---|
| *H04W 16/28* | (2009.01) | |
| *H04B 7/06* | (2006.01) | |
| *H04W 24/10* | (2009.01) | |

(52) U.S. Cl.
CPC .......... *H04W 16/28* (2013.01); *H04B 7/0695* (2013.01); *H04W 24/10* (2013.01)

(58) Field of Classification Search
CPC ..... H04W 16/28; H04W 24/10; H04W 24/08; H04B 7/0695; H04B 7/088
See application file for complete search history.

(56) References Cited

U.S. PATENT DOCUMENTS

| | | | |
|---|---|---|---|
| 10,812,125 B1* | 10/2020 | Badic ................. | H04W 72/542 |
| 2020/0142068 A1* | 5/2020 | Crouch ................. | G01S 7/497 |
| 2021/0076367 A1* | 3/2021 | Bayesteh ................ | H04W 4/70 |
| 2021/0282028 A1* | 9/2021 | Takano ................ | H04B 7/0695 |

* cited by examiner

*Primary Examiner* — Gary Mui
*Assistant Examiner* — Yewon Kim
(74) *Attorney, Agent, or Firm* — Procopio, Cory, Hargreaves & Savitch LLP

(57) ABSTRACT

A method, apparatus, or computer-readable medium with instructions for beam management for radio frequency (RF) sensing at a wireless device. The wireless device performs a first beamsweep of an RF signal and measures a reflection of the RF signal based on the first beamsweep. The wireless device performs a second beamsweep of the RF signal, wherein the first beamsweep is based on a different parameter than the second beamsweep and measures the reflection of the RF signal based on the second beamsweep. The wireless device selects a beam for RF sensing based on the first beamsweep and the second beamsweep.

30 Claims, 16 Drawing Sheets

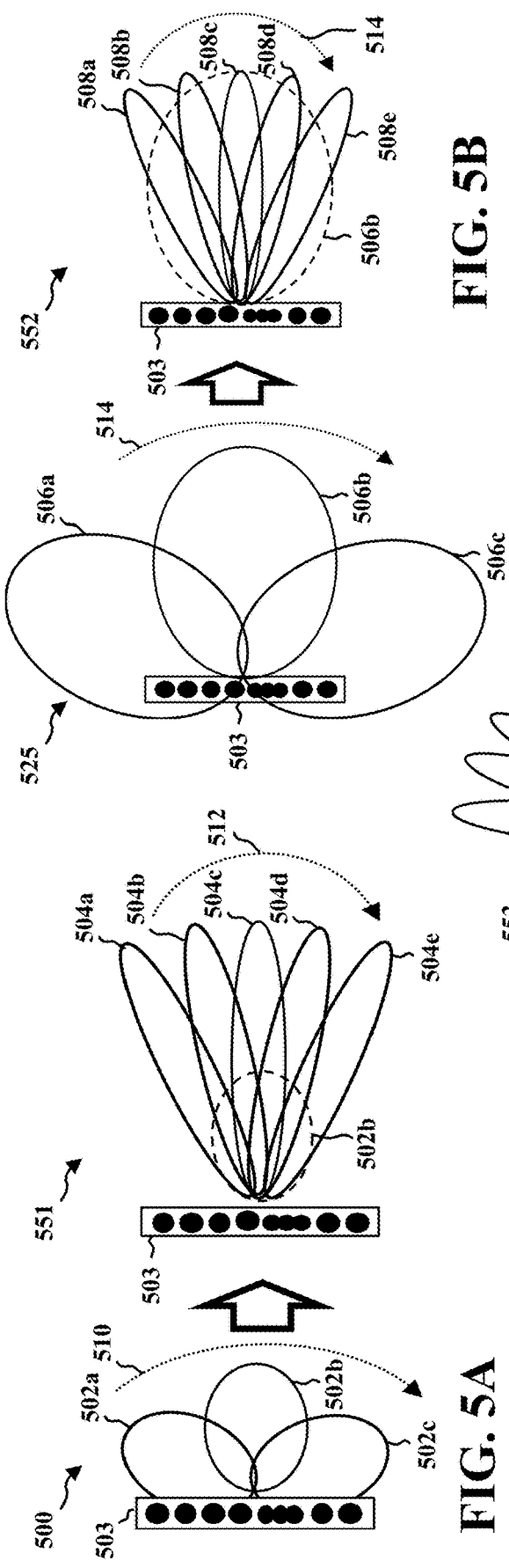
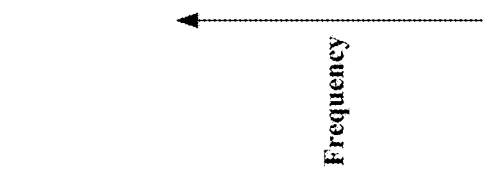
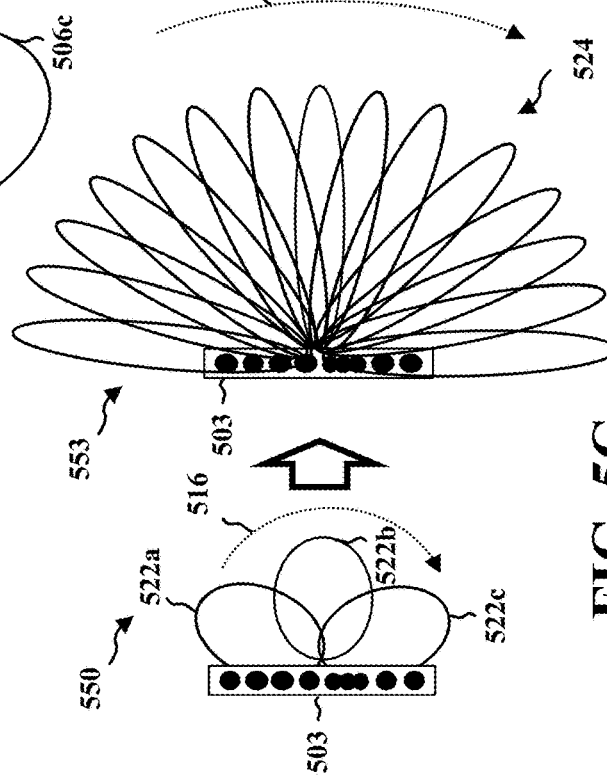
FIG. 5A    FIG. 5B    FIG. 5C    FIG. 5D

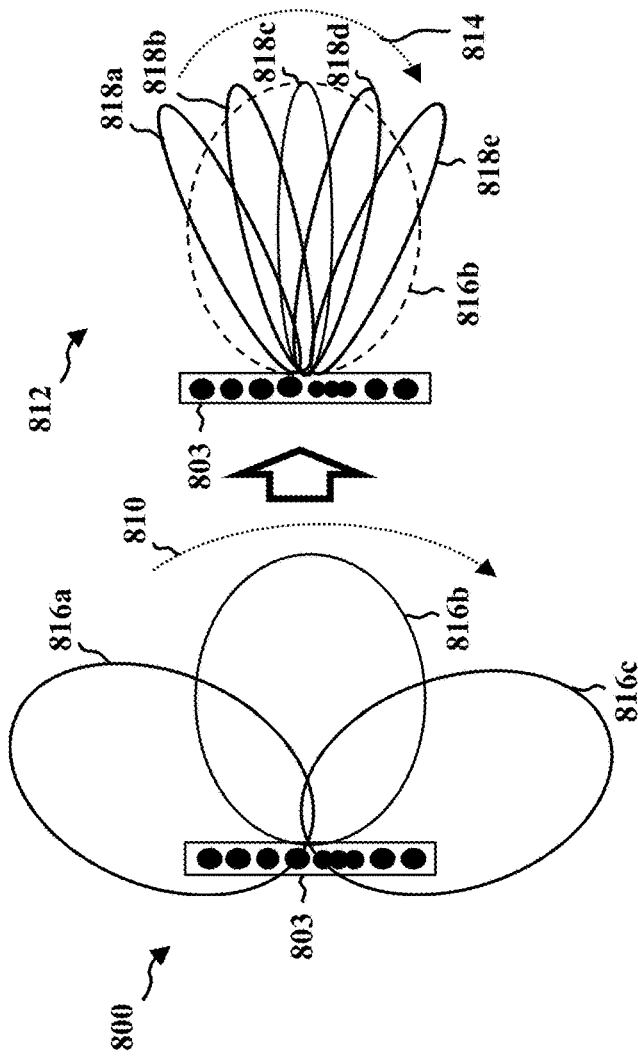
FIG. 8A
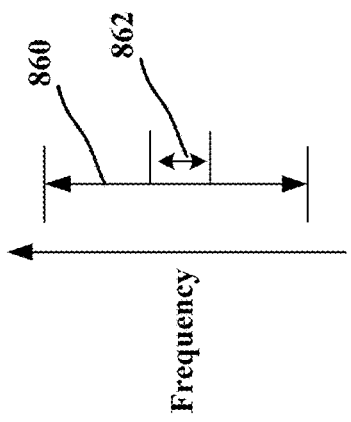
FIG. 8B
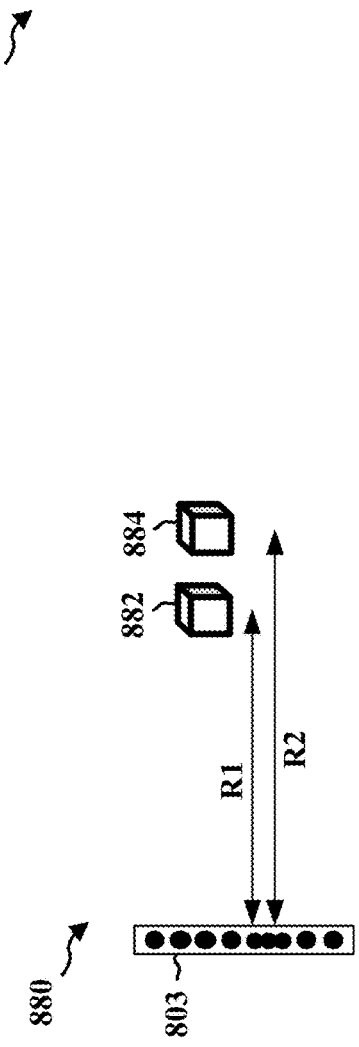
FIG. 8C
| Bandwidth (B) | Range Resolution |
|---|---|
| 10 MHz | 15 m |
| 100 MHz | 1.5 m |
| 600 MHz | 0.25 m |
| 4 GHz | 0.0375 m |
FIG. 8D

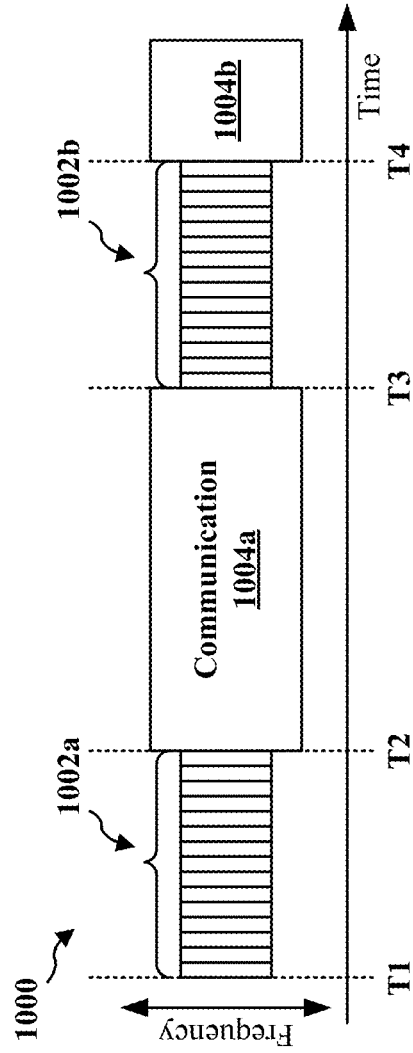
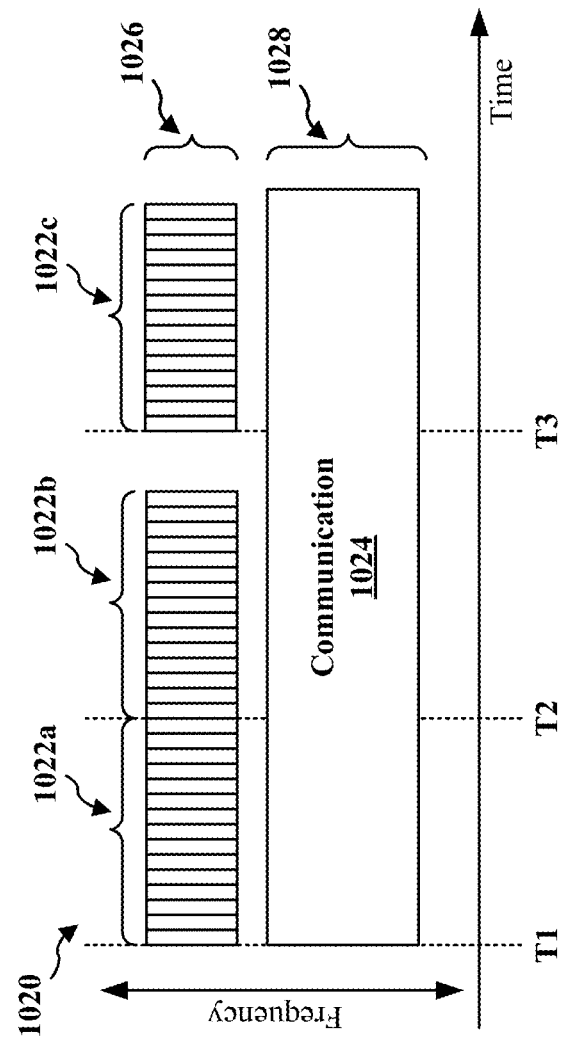
FIG. 10A
FIG. 10B

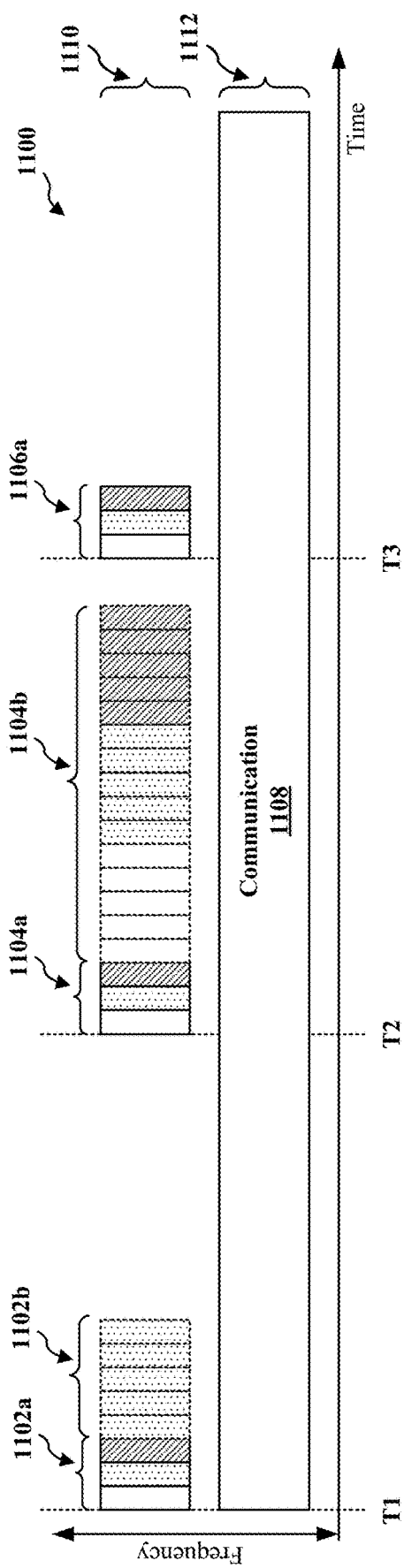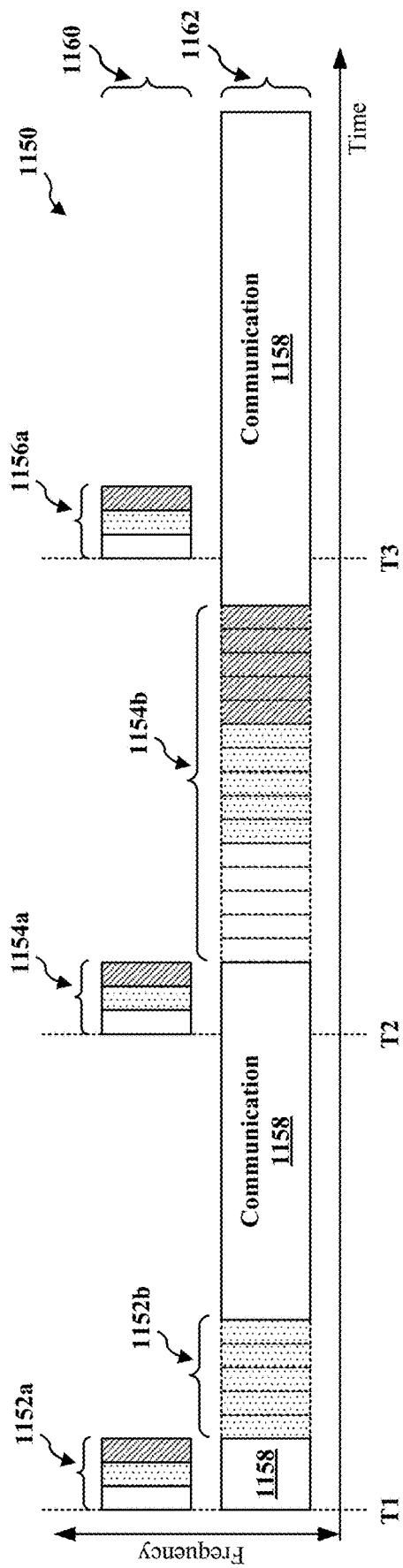
FIG. 11A
FIG. 11B

BEAM MANAGEMENT FOR RADIO FREQUENCY SENSING

CROSS REFERENCE TO RELATED APPLICATION(S)

This application claims the benefit of and priority to U.S. Provisional Application Ser. No. 63/056,357, entitled "Beam Management for Radio Frequency Sensing" and filed on Jul. 24, 2020, and U.S. Provisional Application Ser. No. 63/056,449, entitled "Beam Management for Radio Frequency (RF) Sensing with Multiple Carriers" and filed on Jul. 24, 2020, which are expressly incorporated by reference herein in their entirety.

TECHNICAL FIELD

The present disclosure relates generally to communication systems, and more particularly, to wireless communication including radio frequency sensing and beam management.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for beam management for radio frequency (RF) sensing at a wireless device. The wireless device performs a first beamsweep of an RF signal and measures a reflection of the RF signal based on the first beamsweep. The wireless device performs a second beamsweep of the RF signal, wherein the first beamsweep is based on a different parameter than the second beamsweep and measures the reflection of the RF signal based on the second beamsweep. The wireless device selects a beam for RF sensing based on the first beamsweep and the second beamsweep.

In another aspect of the disclosure, a method, a computer-readable medium, and an apparatus are provided for beam management for RF sensing at a wireless device. An example apparatus may perform a sensing sweep of an RF signal using a first frequency that is frequency division multiplexed with a second frequency for wireless communication. The example apparatus also selects a beam for RF sensing based on the sensing sweep. Additionally, the example apparatus performs RF sensing on the beam using the first frequency.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 5A, 5B, and 5C illustrate examples of monostatic beam management for RF sensing.

FIG. 5D illustrates an example of different bandwidths for different beam management steps for RF sensing.

FIG. 8A illustrates an example of coarse beam detection followed by fine beam detection, in accordance with various aspects of the present disclosure.

FIG. 8B illustrates an example of a narrower bandwidth and a wider bandwidth that may be used for range resolution detection, in accordance with various aspects of the present disclosure.

FIG. 8C depicts an example of range resolution that may be performed by an RF sensing device, in accordance with various aspects of the present disclosure.

FIG. 8D illustrates an example table that depicts example range resolutions that may be achieved by applying different bandwidths, in accordance with various aspects of the present disclosure.

FIG. 10A illustrates an example of one-step RF sensing employing time division multiplexing for sensing and communications, in accordance with various aspects of the present disclosure.

FIG. 10B illustrates an example of one-step RF sensing employing frequency division multiplexing for sensing and communications, in accordance with various aspects of the present disclosure.

FIG. 11A illustrates an example of two-step RF sensing employing frequency division multiplexing for sensing and communications, in accordance with various aspects of the present disclosure.

FIG. 11B illustrates an example of two-step RF sensing employing time and frequency division multiplexing for sensing and communications, in accordance with various aspects of the present disclosure.

DETAILED DESCRIPTION

Figure 1:
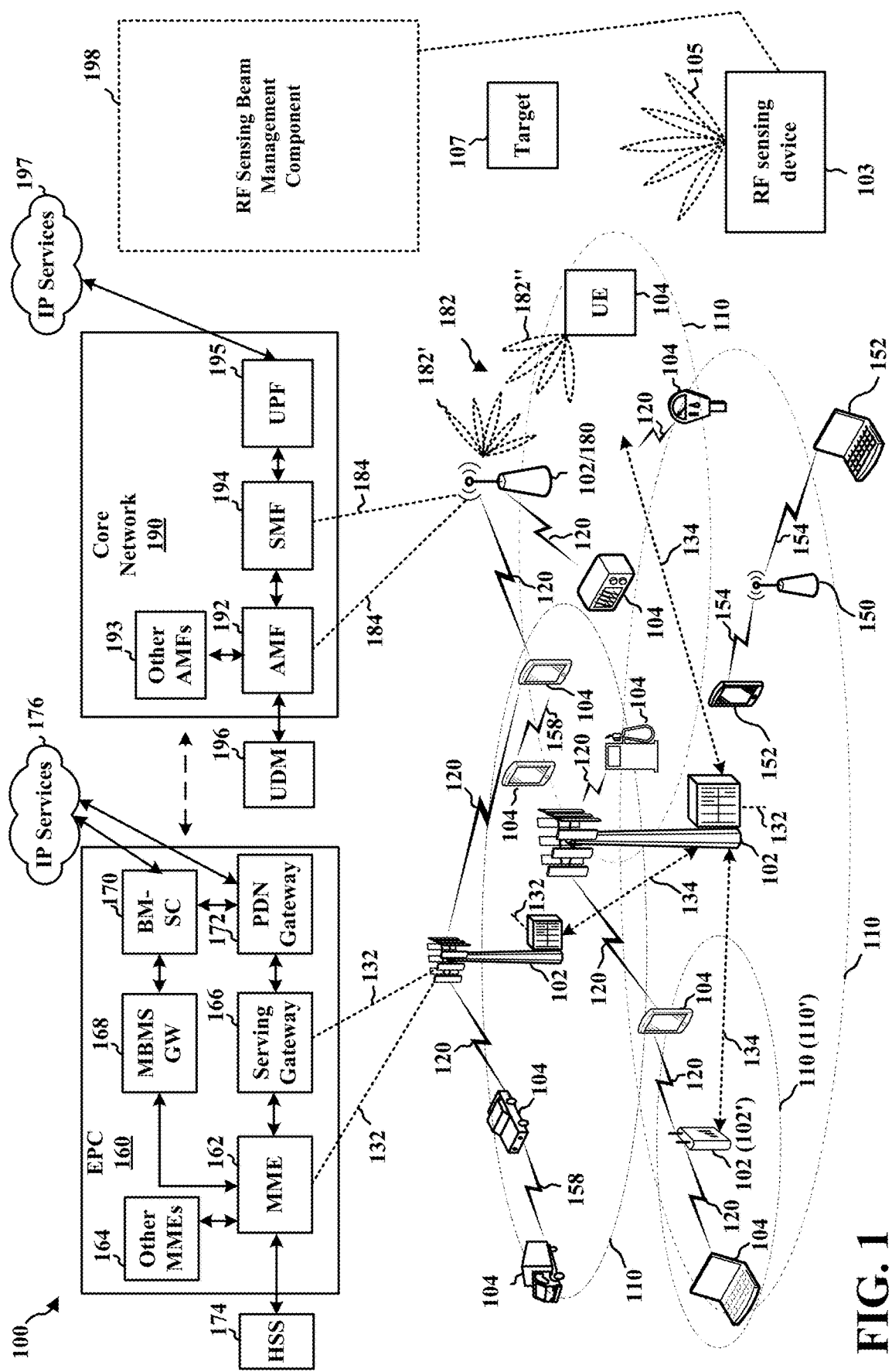
FIG. 1 is a diagram illustrating an example of an RF sensing device and a wireless communications system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100 in which base stations 102 or 180 may wirelessly communicate with UEs 104. Some wireless devices may perform radio frequency (RF) sensing. An RF sensing device 103 may transmit a wireless signal 105 and use information about the signal to image an environment or determine information about a target 107 based on range, doppler, and/or angle information determined from the wireless signal. The signal may include a predefined waveform, such as a frequency modulated continuous wave (FMCW) or a pulse or chirp waveform. In some examples, the RF sensing device 103 may transmit a radar signal to determine information about a target or an environment. An RF sensing component in the device transmits the radar signal. A received signal is compared to the transmitted signal to determine information about the target or environment. RF sensing may be employed to provide health monitoring, such as heartbeat detection, respiration rate monitoring, etc. RF sensing may be employed for gesture recognition, e.g., a human activity recognition, a hand motion recognition, a facial expression recognition, a keystroke detection, sign language detection, etc. RF sensing may be employed to acquire contextual information, e.g., location detection, tracking, determining directions, range estimation, etc. RF sensing may be employed for automotive radar, e.g., detecting an environment around a vehicle, nearby vehicles or items, detecting information for smart cruise control, collision avoidance, etc. RF sensing may be employed to image an environment, e.g., to provide a 3-dimensional (3D) map for virtual reality (VR) applications. RF sensing may be employed to provide high resolution localization, e.g., for industrial Internet-of-things (IIoT) applications.

In some examples, an RF sensing device 103 may provide consumer level radar with advanced detection capabilities. RF sensing may provide touchless or device free interaction with a device or system. For example, a wireless device may detect user gestures to trigger an operation at the wireless device.

In some examples, the RF sensing may use frequency ranges that overlap with wireless communication systems for the signal 105, such as the wireless communication system illustrated in FIG. 1. The RF sensing device 103 may use a waveform for the signal 105 that relates to a communication system. As one non-limiting example, the RF sensing may be performed using a mmW RF signal such as a Frequency Range2 (FR2), Frequency Range 2x (FR2x), and/or Frequency Range 4 (FR4) signal, which may provide improved range for RF sensing detection. In some examples, the RF sensing device 103 may be capable of performing RF sensing and wireless communication. In some examples, the RF sensing device 103 may correspond to a UE 104, a base station 102 or 180, or other access point in the communication system in FIG. 1. In other examples, the RF sensing device 103 may perform RF sensing without having wireless communication capabilities. As illustrated in FIG. 1, the RF sensing device 103 may use beams to transmit the signal 105. The RF sensing device 103 may perform RF sensing using a monostatic radar in which the transmitting device receives a reflection of the transmitted signal in order to perform the RF sensing, such as described in connection with in FIG. 2A. In other examples, the RF sensing device 103 may perform bistatic radar sensing in which a separate receiver receives the RF signal, such as described in connection with FIG. 2B. Aspects presented herein provide for multiple step beam management for RF sensing. The aspects may improve RF sensing by enabling the RF sensing device 103 to use beamformed RF signals in a more efficient manner and to obtain improved information via RF sensing. In FIG. 1, the RF sensing device 103 includes an RF sensing beam management component 198 that is configured to perform a first beamsweep of an RF signal and measure a reflection of the RF signal based on the first beamsweep. The RF sensing beam management component 198 is configured to perform a second beamsweep of the RF signal, where the first beamsweep is based on a different parameter than the second beamsweep and to measure the reflection of the RF signal based on the second beamsweep. The RF sensing beam management component 198 is further configured to select a beam for RF sensing based on the first beamsweep and the second beamsweep. The RF sensing device 103 may then use the selected beam(s) to transmit the RF sensing signal 105. The RF sensing device 103 may use a reflection of the signal to determine information about the target 107 or the environment in a monostatic radar manner. The RF sensing device 103 may be within or outside of a coverage area 110 of a base station 102 or 180. In some aspects, the RF sensing beam management component 198 may be configured to perform a sensing sweep of an RF signal using a first frequency that is frequency division multiplexed with a second frequency for wireless communication.

The wireless communications system illustrated in FIG. 1 (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Wireless communication may be based on frequency and/or time resources. Different wireless communication technologies may have different frame structures and/or different channels. A resource grid may be used to represent the frame structure. In an example, each time slot may include a resource block (RB) (also referred to as physical RBs (PRBs)) that extends for multiple subcarriers, e.g., 12 consecutive subcarriers. The resource grid is divided into multiple resource elements (REs). The number of bits carried by each RE depends on the modulation scheme.

Figure 2:
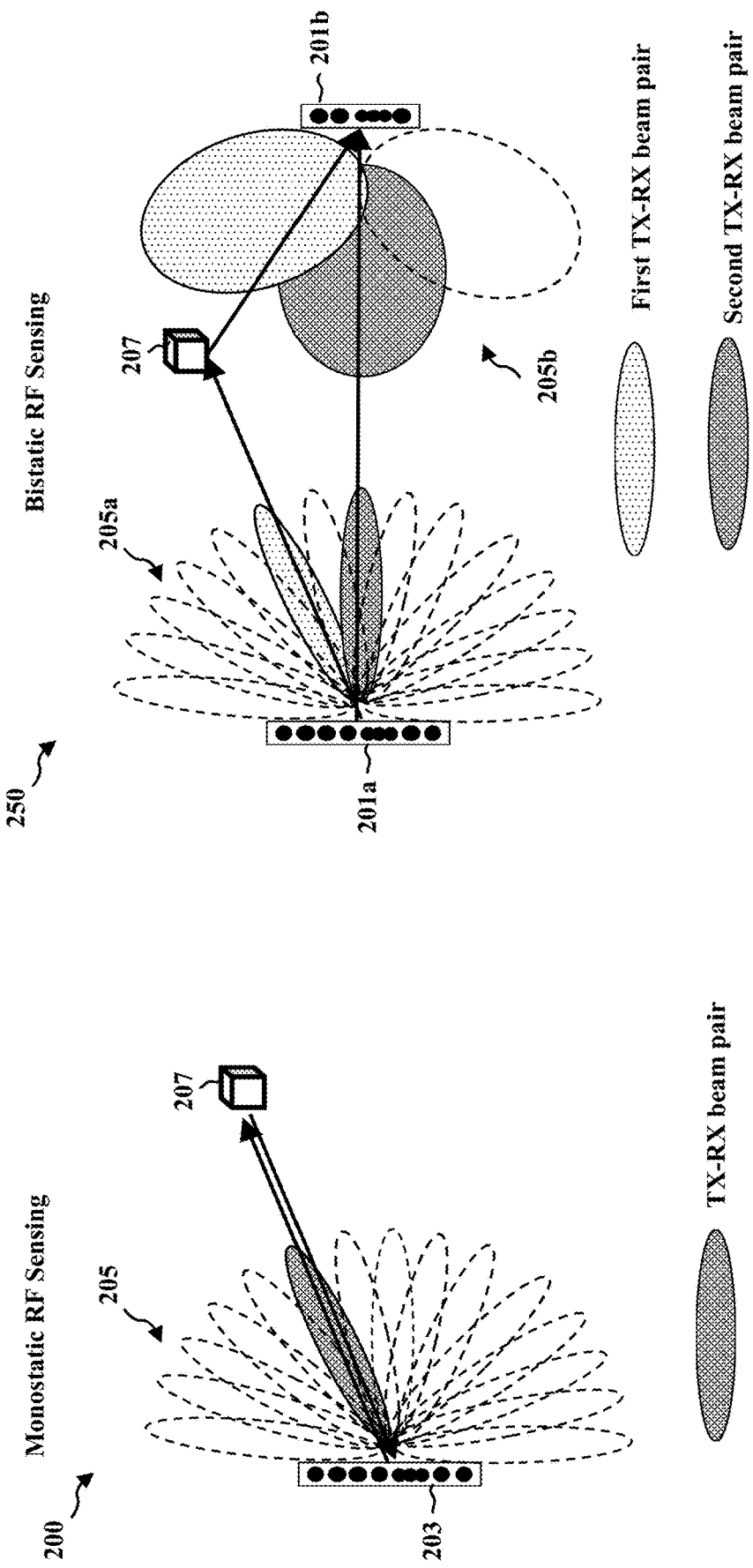
FIG. 2A illustrates an example of monostatic RF sensing, in accordance with various aspects of the present disclosure.
FIG. 2B illustrates an example of bistatic RF sensing, in accordance with various aspects of the present disclosure.

FIG. 2A illustrates an example of monostatic RF sensing 200 in which the RF sensing device 203 transmits the RF signal using beams 205 and receives a reflection of the RF signal that is reflected by the target 207 using the same beams 205. In the monostatic example, a transmission-reception beam pair may include a single beam. FIG. 2A illustrates the transmission beam being the same beam as the reception beam. Beam management may be applied for a single beam, e.g., the transmission beam, whereas beam management for wireless communication, such as for beamforming between a base station 102 or 180 and a UE 104 in FIG. 1 may involve management of different transmission beams and reception beams. For example, beam management may include the determination of a transmission beam from the base station and a reception beam at the UE.

FIG. 2B illustrates an example of bistatic RF sensing 250 in which a transmission unit 201a transmits the RF signal using one or more transmission beams 205a and a reception unit 201b receives the RF signal using one or more reception beams 205b. The transmission unit 201a and reception unit 201b may be located at separate locations. In FIG. 2B, the transmission beam is separate from the reception beam, whereas the transmission unit and reception unit in FIG. 2A are co-located. FIG. 2B illustrates the first transmission-reception beam pair for a reflection of the signal from the target 207, whereas the second transmission-reception beam pair is for the signal received directly from the transmission unit 201a. The transmission and reception beam pairs in the bi-static RF example may be separately managed for RF sensing. The beam management for RF sensing may be performed separately than beam management for beam pairs for communication. For example, the first transmission-reception beam pair may be selected for RF sensing, whereas, the second transmission-reception beam pair may be selected for communication.

Figure 3:
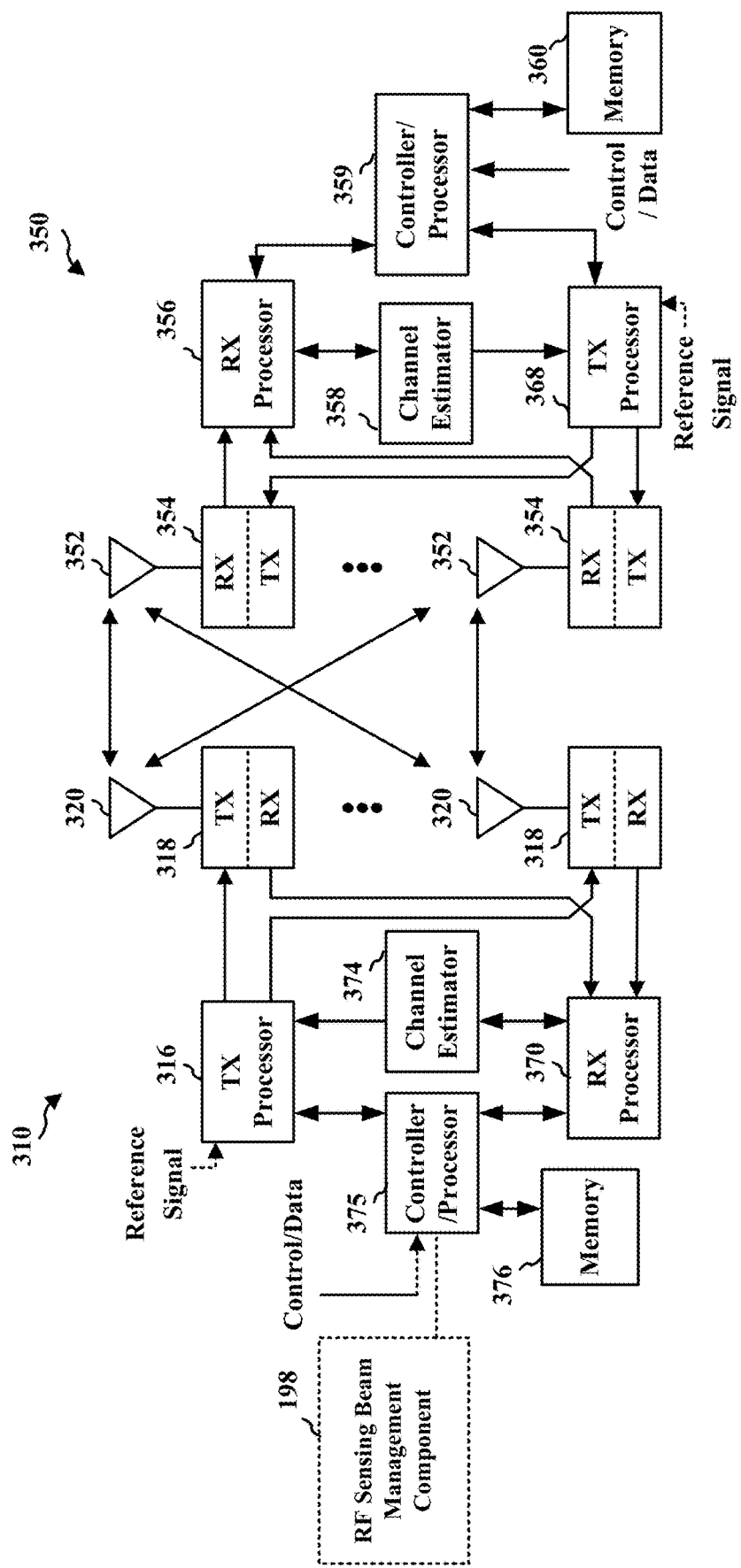
FIG. 3 is a diagram illustrating an example of a wireless device capable of RF sensing, in accordance with various aspects of the present disclosure.

FIG. 3 is a block diagram of a first wireless device 310 having components for wireless transmission. The wireless device 310 may be an RF sensing device configured to perform the aspects presented herein. In some examples, the wireless device 310 may be capable of communication with another wireless device 350, such as described in connection with FIG. 1. The wireless device 310 may include one or more antennas 320 may include a transmitter/receiver 318 with a corresponding transmit processor 316 and receive processor 370 that are configured to perform monostatic sensing or bi-static sensing, such as described in connection with FIG. 2A or FIG. 2B. The one or more antenna 320, transmitter/receiver 318, transmit processor 316, and receive processor 370 may transmit an RF sensing signal and receive reflections of the RF sensing signal. The controller/processor 375 may determine RF sensing information about a target based on the received signal.

In some examples, the wireless device 310 may be capable of wireless communication in addition to RF sensing. For communication, packets may be provided to a controller/processor 375. The controller/processor 375 implements layer 3 and layer 2 functionality. The transmit (TX) processor 316 and the receive (RX) processor 370 implement layer 1 functionality associated with various signal processing functions. Different spatial streams may be provided to a different antenna 320 via a separate transmitter 318 TX. Each transmitter 318 TX may modulate an RF carrier with a respective spatial stream for transmission.

At the wireless device 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the wireless device 350. If multiple spatial streams are destined for the wireless device 350, they may be combined by the RX processor 356 into a single stream, such as an OFDM symbol stream. The RX processor 356 may convert the OFDM symbol stream from the time-domain to the frequency domain using a Fast Fourier Transform (FFT). The frequency domain signal may comprise a separate OFDM symbol stream for each subcarrier of the OFDM signal. The symbols on each subcarrier, and the reference signal, are recovered and demodulated by determining the most likely signal constellation points transmitted by the wireless device 310. These soft decisions may be based on channel estimates computed by the channel estimator 358. The soft decisions may then be decoded and deinterleaved to recover the data and control signals that were originally transmitted by the wireless device 310 on the physical channel. The data and control signals may then be provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing to recover IP packets from the EPC 160. The controller/processor 359 may also be responsible for error detection using an ACK and/or NACK protocol to support HARQ operations.

Channel estimates derived by a channel estimator 358 from a reference signal or feedback transmitted by the wireless device may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The received transmission may be processed at the wireless device 310 in a manner similar to that described in connection with the receiver function at the wireless device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. Channel estimates may be determined by the channel estimator 374. The memory 376 may be referred to as a computer-readable medium. In the UL, the controller/processor 375 provides demultiplexing between transport and logical channels, packet reassembly, deciphering, header decompression, control signal processing to recover packets from the wireless device 350. The controller/processor 375 may also be responsible for error detection using an ACK and/or NACK protocol to support HARQ operations.

At least one of the TX processor 316, the RX processor 370, and the controller/processor 375 may be configured to perform aspects in connection with the RF sensing beam management component 198 of FIG. 1 to perform a multiple step beam management to determine one or more transmission beam (which may also be the reception beam) for RF sensing.

Figure 4:
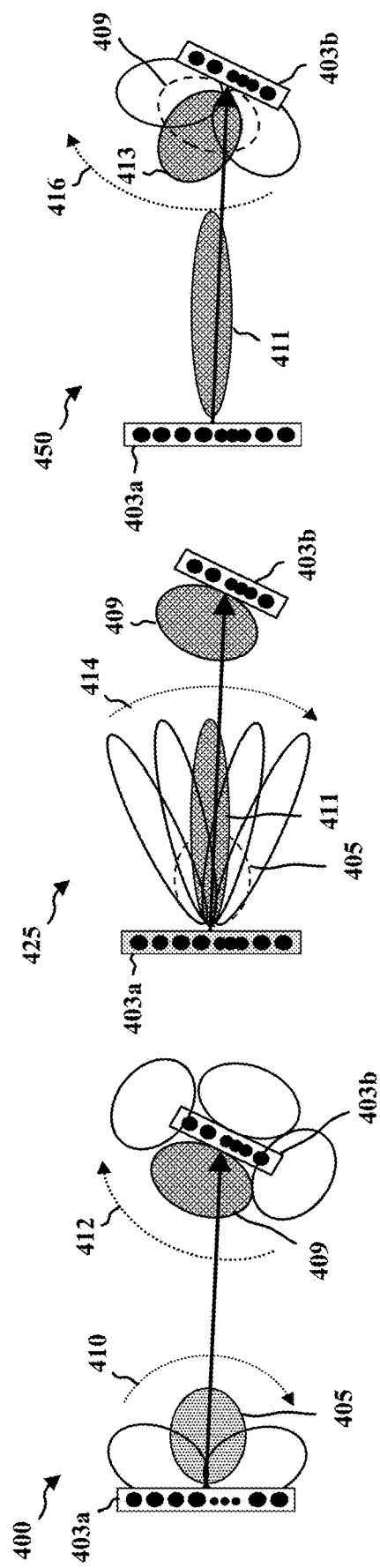
FIG. 4 illustrates an example of multiple step beam management, in accordance with various aspects of the present disclosure.

FIG. 4 illustrates an example of multiple step beam management that may be employed between a separate transmission unit and a reception unit. In some examples, the beam management may be performed between separate wireless communication devices, such as described in connection with beamforming 182 in FIG. 1.

In a first step 400, the transmission unit 403a of an RF sensing device may beamsweep an RF signal by transmitting the RF signal over multiple beams, as shown by arrow 410. The transmission unit 403a may use a beamsweeping pattern by transmitting on different beams at different times, for example. The reception unit 403b monitors for the RF signal over multiple beams, e.g., based on beamsweeping 412. In the first step 400, transmission beam 405 transmits a signal that is received by the reception beam 409 at the reception unit 403b. The first step 400 may include a beamsweep by the transmission unit and the reception unit over an entire region. As illustrated, the regions may be different for the transmission unit 403a and the reception unit 403b. For example, the transmission unit 403a receives over a region surrounding the reception unit 403b, whereas the transmission unit 403a transmits over a region on one side of the transmission unit 403a. The first step 400 may include a coarse beam determination using a wider set of beams. The first beam may be referred to as a coarse transmission/reception beam determination.

In the second step 425, the transmission unit 403a beamsweeps 414 a set of narrower beams over a partial region. The partial region may be based on one or more beams identified in the first step 400. For example, the partial region in the second step 425 is based on the coarse beam (e.g., beam 405). The beams used to transmit the beam management signal in the second step 425 are narrower than the beams used to transmit the beam management signal in the first step 400. The reception unit 403b may receive the beam management signal using one or more beams identified in the first step 400. In the second step in FIG. 4, narrower beam 411 is identified. The second step may be referred to as a fine transmission beam determination.

In a third step 450, the transmission unit 403a transmits a beam management signal using one or more beams identified in the second step 425, and the reception unit 403b monitors for the beam management signal using beam sweeping 416 over a partial region. The partial region used by the reception unit 403b may be based on the reception beam 413 identified in the first step 400. The beam sweeping at the reception unit 403b may use narrower beams that the beams used in the first step 400 and/or the second step 425. The third step 450 may be referred to as a fine reception beam determination. The fine beam determination for the transmission beam or the reception beam may be referred to as beam refinement. The multiple steps may provide for a coarse beam identification and a fine beam determination that builds on the coarse beam identification. The multiple step beam management provides a hierarchical approach to identify a transmission/reception beam pair for the transmission unit and the reception unit.

As described in connection with FIG. 2A, RF sensing may involve a monostatic radar system in the transmission unit and reception unit are co-located. Aspects presented herein provide for multiple step beam management for a monostatic RF sensing device. As described in connection with FIG. 2A, the beam management may be used to identify one or more beams for use as both a transmission beam and a reception beam for monostatic RF sensing.

In some aspects, the RF sensing device 503 may perform coarse beam detection followed by a fine beam detection. FIG. 5A illustrates example of a first step 500 of coarse beam detection followed by a second step 551 of fine beam detection. FIG. 5B illustrates another example of coarse beam detection 525 followed by fine beam detection 552. In the first step (e.g., 500 or 525) of coarse beam detection, the RF sensing device 503 uses beam sweeping 510 or 514 to transmit and monitor for a signal over multiple beams covering a region. The RF sensing device 503 transmits the signal and monitors for a reflection of the transmitted signal. In the second step of fine beam detection or beam refinement, e.g., 551 or 552, the RF sensing device 503 transmits a signal over a portion of the region using beam sweeping 512 or 514. The portion of the region may be determined based on measurements of the reflected signal in the first step (e.g., 500 or 525). For example, in FIG. 5A, the RF sensing device 503 transmits the signal using wider beams 502a, 502b, and 502c. Then, in the second step, the RF sensing device transmits a signal using narrower beams 504a, 504b, 504c, 504d, and 504e that cover a region based on the beam 502b identified in the first step. In FIG. 5B, the RF sensing device 503 first transmits the signal using wider beams 506a, 506b, and 506c. Then, in the second step (e.g., 552), the RF sensing device transmits a signal using narrower beams 508a, 508b, 508c, 508d, and 508e that cover a region based on the beam 506b identified in the first step.

In some aspects, the RF sensing device 503 may perform scanning using beam sweeping 510 or 514 over multiple beams in a first step and may perform tracking using one or more fixed beams in a second step (e.g., 551 or 552). For example, the RF sensing device 503 may perform scanning to scan an environment using beams that cover a region in the first step. In the second step, the RF sensing device 503 may transmit the signal using a subset of one or more beams that cover a portion of the region determined in step 1. The first, scanning step may help to determine a general region of a target, and the second step may be used to perform tracking of the target within the general region.

In some aspects, the RF sensing device 503 may perform short range detection in a first step and may perform long range detection in a second step. FIG. 5C illustrates an example in which the RF sensing device 503 beam sweeps 516 a signal over a region using a set of wide beams (e.g., beams 522a, 522b, and 522c) in a first step 550 to perform a shorter range detection. In the second step 553, the RF sensing device 503 beam sweeps 518 over the region using a set of narrower beams 524 to perform a longer range detection. The beamsweep in the first step 550 and the second step 553 may cover substantially the same region, such as illustrated in FIG. 5C. The second step 553 may beam sweep over a larger number of narrower beams than the first step.

In some aspects, the RF sensing device 503 may perform low range resolution detection in the first beam management step and may perform a high range resolution detection in the second beam management step. The low range resolution may include a beam sweep over a region, such as shown in the first step FIG. A or 5B using a narrow bandwidth, and the high range resolution may include a beamsweep over a limited region, such as shown in the second step of FIG. 5A or FIG. 5B using a wide bandwidth. FIG. 5D illustrates an example of a narrower bandwidth 562 in frequency that may be used for the first step of the beam sweep over the region as part of the lower range detection and an example of a wider bandwidth 560 that may be used for the second step of the beam sweep over the portion of the region as part of the higher range resolution.

When multiple step beam management is performed to determine a transmission beam and reception beam for wireless communication, the measurements of the signal in the first step and the second step may be based on different minimum required reception signal-to-noise ratios (SNRs). For example, a lower beamforming gain may be used for beam management with wider beams, e.g., in a coarse beam detection, for a low data rate transmission or a highly reliably transmission. A higher beamforming gain may be used for beam management with the narrower beams, e.g., in a finer beam detection, for high rate data. For example, a two-step beam management such as for communication using the parameters in Table 1 would have a higher minimum received SNR ($RxSNR_2$) for the second step 551 than the minimum received SNR ($RxSNR_1$) for the first step 500. In table 1, P corresponds to the transmission power, G corresponds to the antenna gain, the effective isotropic radiate power (EIRP) is based on P+G, T corresponds to the signal duration, and R corresponds to the range or distance of signal.

TABLE 1

| Step 1 (wider beam) | Step 2 (narrower beam) | Comparison between Step 1 and Step 2 |
|---|---|---|
| $P_1$ | $P_2$ | $P_1 \approx P_2$ |
| $G_1$ | $G_2$ | $G_1 < G_2$ |
| $EIRP_1$ | $EIRP_2$ | $EIRP_1 < EIRP_2$ |
| $T_1$ | $T_2$ | $T_1 = T_2$ |
| $R_1$ | $R_2$ | $R_1 = R_2$ |
| $RxSNR_1$ | $RxSNR_2$ | $RxSNR_1 < RxSNR_2$ |

In contrast to beam management for communication, it is better for multiple steps of beam management for RF sensing, e.g., monostatic RF sensing, to be based on the same, or similar, minimum require reception SNRs. However, a first step that uses a wider beam (with a lower beamforming gain) would have a different reception SNR than a second step that uses a narrower beam (with a higher beamforming gain), such as description in connection with FIGS. 5A-5C. As presented herein, the RF sensing device 503 may apply different parameters for the first beam management step than in the second beam management step in order to cause the minimum required reception SNR to closer for the two steps.

In some aspects, the RF sensing device 503 may use a different transmission power for the first beam management step (e.g., 500, 525, or 550) than for the second beam management step (e.g., 551, 552, or 553). For example, the RF sensing device 503 may use a higher transmission power to beamsweep the signal for the first step in which wider beams are transmitted and may use a lower transmission power to beamsweep the signal for the second step in which narrower beams are transmitted. The different transmission power may provide for more similar reception SNR between the two steps that involve different beam widths.

In some aspects, the RF sensing device 503 may use a different transmission power per tone (e.g., per subcarrier in a frequency domain) for a first beam management step (e.g., 500, 525, or 550) than for the second beam management step (e.g., 551, 552, or 553). For example, the RF sensing device 503 may use a higher transmission power per subcarrier to beamsweep the signal using a narrower bandwidth (e.g., 562) for the first step and may use a lower transmission power to beamsweep the signal using a wider bandwidth (e.g., 560) for the second step. The different transmission power per subcarrier may provide for more similar reception SNR between the two steps that involve different signal bandwidths.

In some aspects, the RF sensing device 503 may use a different signal duration for a first beam management step (e.g., 500, 525, or 550) than for the second beam management step (e.g., 551, 552, or 553). For example, the RF sensing device 503 may use a longer duration in a time domain (e.g., a longer signal pulse) when transmitting the signal on each beam during the beamsweep for the first step and may use a shorter duration in the time domain (e.g., a shorter signal pulse) when transmitting the signal on the beams being swept in the second step. The longer signal duration in the first step may provide for more similar reception SNR between the two steps.

In some aspects, the RF sensing device 503 may use a different range, e.g., range resolution, for a first beam management step (e.g., 500, 525, or 550) than for the second beam management step (e.g., 551, 552, or 553). For example, the RF sensing device 503 may use a shorter range signal when transmitting the signal on each beam during the beamsweep for the first step and may use a longer range signal when transmitting the signal on the beams being swept in the second step. The longer signal duration in the first step may provide for more similar reception SNR between the two steps.

Table 2 illustrates an example of four example parameters that different between the first step and a second step of beam management for RF sensing in order to have a minimum received SNR that is similar for the first and second step (e.g., $RxSNR_2$ $RxSNR_1$). In the table, $P_{per-tone,1}$ corresponds to a transmission power per tone (e.g., per subcarrier) for the first step, $P_{per-tone,2}$ corresponds to a transmission power per subcarrier for the second step, $EIRP_{per-tone,1}$ corresponds to an EIRP per subcarrier for the first step, $EIRP_{per-tone,2}$ corresponds to an EIRP per subcarrier for the second step $BW_1$ corresponds to the bandwidth for the first step, and $BW_2$ corresponds to the bandwidth for the second step. One or more of the adjusted parameters in table 2 may be applied for the multiple step examples described in connection with FIGS. 5A-D.

TABLE 2

| Different transmission Power | Different transmission power per tone (subcarrier) | Different signal duration |
|---|---|---|
| $P_1 > P_2$ | $P_{per-tone,1} > P_{per-tone,2}$ | $P_1 = P_2$ |
| $G_1 < G_2$ | $G_1 < G_2$ | $G_1 < G_2$ |
| $EIRP_1 \approx EIRP_2$ | $EIRP_{per-tone,1} \approx EIRP_{per-tone,2}$ | $EIRP_1 < EIRP_2$ |
| $T_1 = T_2$ | $T_1 = T_2$ | $T_1 > T_2$ |
| $R_1 = R_2$ | $R_1 = R_2$ | $R_1 = R_2$ |
| $RxSNR_1 \approx RxSNR_2$ | $RxSNR_1 \approx RxSNR_2$ | $RxSNR_1 \approx RxSNR_2$ |
| | $P_1 \approx P_2, BW_1 < BW_2$ | |

Table 3 illustrates example parameters that may be applied for multiple step beam management for RF sensing using a different range between the first step and the second step. In some examples, the different range parameters may be applied for the multiple step beam management described in connection with FIG. 5C, which may include sweeping the full region in both the first step and the second step. In some examples, the targets for the second step may be different from the targets for first step.

TABLE 3

| Different transmission Power |
|---|
| $P_1 \approx P_2$ |
| $G_1 < G_2$ |
| $EIRP_1 < EIRP_2$ |
| $T_1 = T_2$ |
| $R_1 < R_2$ |
| $RxSNR_1 \approx RxSNR_2$ |

Figure 6:
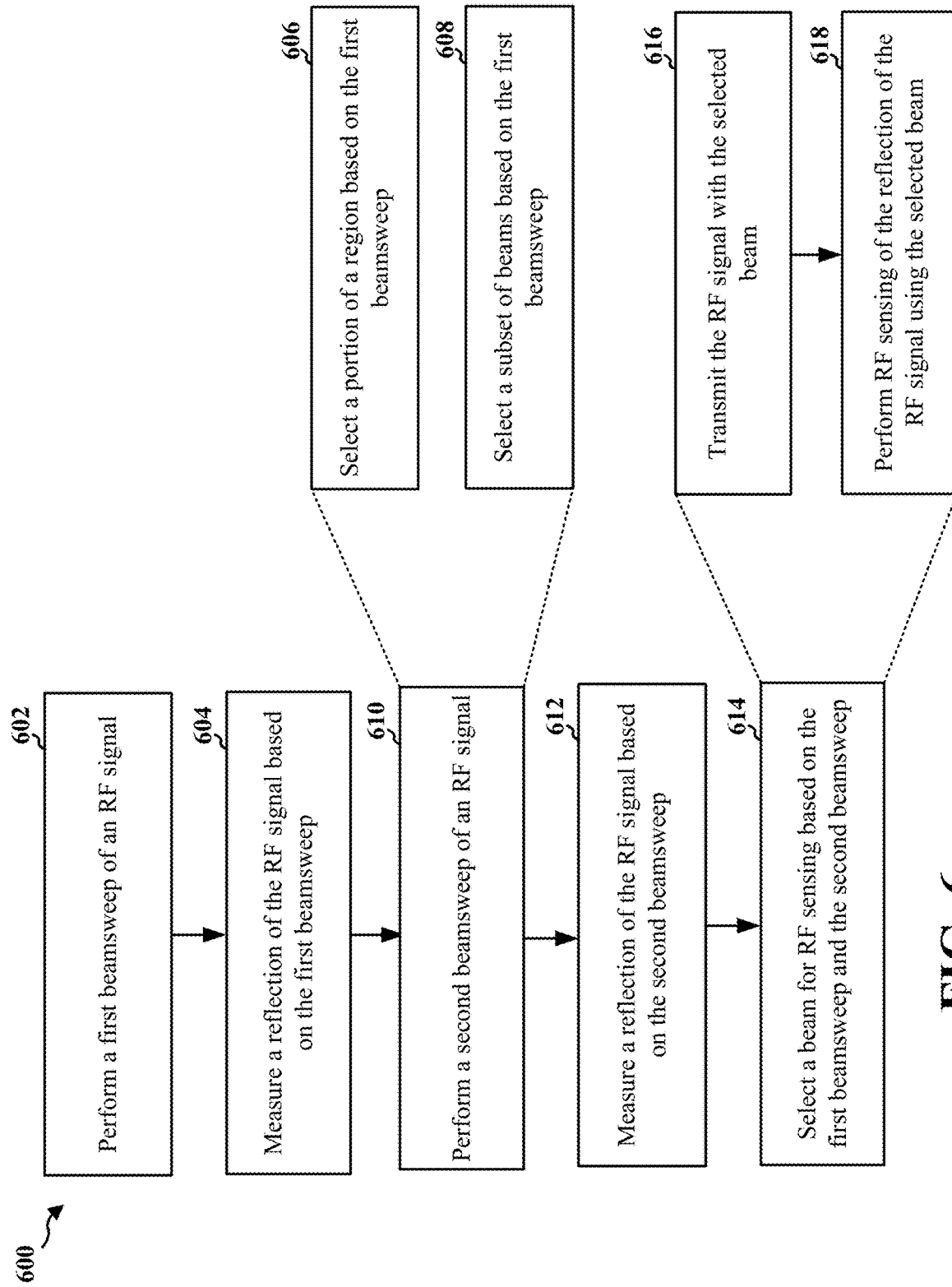
FIG. 6 is a flowchart of a method of beam management for RF sensing at a wireless device, in accordance with the teachings disclosed herein.

FIG. 6 is a flowchart 600 of a method of beam management for radio frequency (RF) sensing at a wireless device. The method may be performed by an RF sensing device (e.g., 103, 503, the device 310 or 203, which may include the transmission unit 201a, 403a and/or reception unit 201b, 403b; the apparatus 702). The method may help to improve monostatic RF sensing through multiple step beam management.

At 602, the wireless device performs a first beamsweep of an RF signal. The wireless device transmits an RF signal in a pattern over a first set of beams, such as described in connection with any of 500, 525, 550 in FIGS. 5A-5D. The first beamsweep may be performed by the transmission unit 403a. The first beamsweep may be performed, e.g., by the first beamsweep component 740 of the RF sensing manager 732, the transmission component 734, and/or the RF transceiver 722 of the apparatus 702 in FIG. 7.

At 604, the wireless device measures a reflection of the RF signal based on the first beamsweep. For example, the wireless device may perform a monostatic RF measurement, such as described in connection with FIG. 2A. The measurement may be performed, e.g., by the measurement component 742 of the RF sensing manager 732 of the apparatus 702.

At 610, the wireless device performs a second beamsweep of the RF signal, where the first beamsweep is based on a different parameter than the second beamsweep. The first and second beamsweep may include any of the aspects described in connection with FIGS. 5A-5D, for example. The first beamsweep may be performed, e.g., by the second beamsweep component 744 of the RF sensing manager 732, the transmission component 734, and/or the RF transceiver 722 of the apparatus 702 in FIG. 7.

At 612, the wireless device measures the reflection of the RF signal based on the second beamsweep. The measurement may be performed, e.g., by the measurement component 742 of the RF sensing manager 732 of the apparatus 702. In some examples, the first beamsweep may be performed over a region, and at 606, the wireless device may select a portion of the region based on measurements of the reflection of the RF signal over the first beamsweep, where the second beamsweep is performed over the portion of the region. The selection of the portion of the region may be performed, e.g., by the region selection component 748 of the RF sensing manager 732 in the apparatus 702 in FIG. 7. FIGS. 5A and 5B illustrate examples of a first beamsweep over a region and a second beamsweep over a portion of the region. For example, the first beamsweep may be a coarse beamsweep with a set of wider beams, and the second beamsweep may be a finer beamsweep with a set of narrower beams.

In another example, the first beamsweep may be performed over a set of beams, and at 608, the wireless device may select a subset of beams based on measurements of the reflection of the RF signal over the first beamsweep, where the second beamsweep is performed over the subset of beams. The selection of the subset of beams may be performed, e.g., by the beam subset selection component 750 of the RF sensing manager 732 in the apparatus 702 in FIG. 7. The first beamsweep may include scanning with a larger set of beams, and the second beamsweep may include tracking a target with a reduced subset of the larger set of beams.

In some examples, the first beamsweep and the second beamsweep may have a different range. For example, the first beamsweep may have a shorter range parameter than the second beamsweep. The first beamsweep may be performed with a wider beam than the second beamsweep, such as illustrated in each of FIGS. 5A-5C.

The first beamsweep and the second beamsweep may have a different range resolution. For example, the first beamsweep may have a lower range resolution parameter than the second beamsweep. As an example, the first beamsweep may be performed with a narrower bandwidth than the second beamsweep, such as described in connection with FIG. 5D.

The first beamsweep may be performed over a region, and, at 606, the wireless device may select a portion of the region based on measurements of the reflection of the RF signal over the first beamsweep. The second beamsweep may then be performed at 610 over the portion of the region. The selection of the portion of the region may be performed, e.g., by the region selection component 748 of the RF sensing manager 732 in the apparatus 702 in FIG. 7.

The first beamsweep may be performed with a different transmission power than the second beamsweep. The different parameters may help the minimum received SNR of the two beam sweeps to be similar, such as described in connection with Tables 1-3. For example, the first beamsweep may be performed with a higher transmission power than the second beamsweep. As another example, the first beamsweep may be performed with a different transmission power per subcarrier and a different bandwidth than the second beamsweep. As another example, the first beamsweep may be performed with a higher transmission power per subcarrier than the second beamsweep and a narrower bandwidth than the second beamsweep. As another example, the first beamsweep may be performed with a different signal duration than the second beamsweep. As another example, the first beamsweep may be performed with a longer signal duration in a time domain than the second beamsweep.

At 614, the wireless device selects a beam for RF sensing based on at least one of the first beamsweep or the second beamsweep. The selection may be performed, e.g., by the beam selection component 746 of the RF sensing manager 732 in the apparatus 702. The wireless device may select more than one beam in some examples. For example, at least some aspects of the second beamsweep may be determined based on the first beamsweep. Then, the beam may be selected based on the SNR, received signal strength, or other measurement indicating one or more best beams from the second beamsweep.

At 616, the wireless device may transmit the RF signal with the selected beam. The wireless device may transmit a radar signal to perform RF sensing. The signal may include any of the aspects of an RF signal described herein. The RF signal may be transmitted, e.g., by the RF signal component of the RF sensing manager 732, the transmission component 734 and/or the RF transceiver 722 of the apparatus 702.

At 618, the wireless device may perform the RF sensing of the reflection of the RF signal using the selected beam. The wireless device may perform monostatic RF sensing including any of the aspects described in connection with FIG. 2A. After receiving the RF sensing signal, the receiver can estimate doppler related metrics, for example, of the signal between the wireless device and a target object. The RF sensing may be used to obtain a distance, speed, direction, etc. of the target. The RF sensing may be performed, e.g., by the RF sensing component 754 of the RF sensing manager 732 in the apparatus 702 in FIG. 7.

The first beamsweep and/or the second beamsweep may be based on frequency division multiplexing with a frequency for wireless communication. FIG. 15 illustrates an example flowchart showing aspects of frequency division multiplexing an RF signal for RF sensing with a frequency for wireless communication. The frequency division multiplexing may include any of the aspects described in connection with FIGS. 10A-16, for example. As an example, the first beamsweep or the second beamsweep may include scanning a set of beams using a first frequency that is different than a second frequency for the wireless communication. In some aspects, the device may perform two consecutive sensing sweeps separated by a non-zero gap and overlapping in time with the wireless communication. In some aspects, the device may perform two consecutive sensing sweeps separated by a non-zero gap and not overlapping in time with the wireless communication. In some aspects, the device may perform two consecutive sensing sweeps separated by a zero gap and overlapping in time with the wireless communication.

Figure 7:
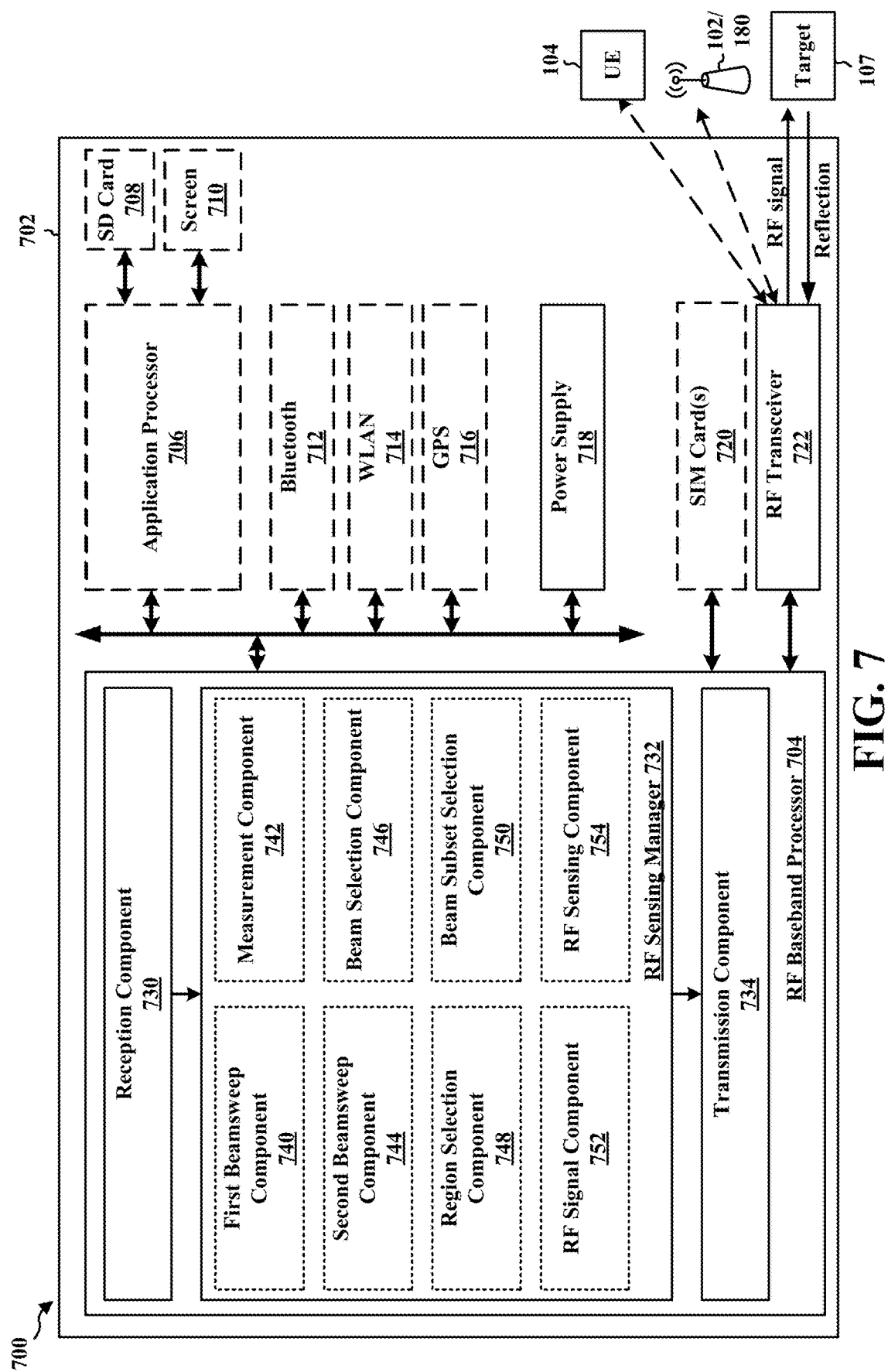
FIG. 7 is a diagram illustrating an example of a hardware implementation for an example apparatus, in accordance with the teachings disclosed herein.

FIG. 7 is a diagram 700 illustrating an example of a hardware implementation for an apparatus 702. The apparatus 702 is an RF sensing device and includes a RF baseband processor 704 (also referred to as a modem) coupled to an RF transceiver 722. In some examples, the apparatus may be capable of wireless communication in addition to RF sensing. For example, the apparatus may be a UE, a base station, or another access point that is capable of RF sensing. If the RF sensing device is a UE, the processor may be coupled to one or more subscriber identity modules (SIM) cards 720, an application processor 706 coupled to a secure digital (SD) card 708 and a screen 710, a Bluetooth module 712, a wireless local area network (WLAN) module 714, a Global Positioning System (GPS) module 716, and a power supply 718. The processor 704 communicates through the RF transceiver 722 with the UE 104 and/or BS 102/180. The RF baseband processor 704 may include a computer-readable medium/memory. The computer-readable medium/memory may be non-transitory. The RF baseband processor 704 is responsible for general processing, including the execution of software stored on the computer-readable medium/memory. The software, when executed by the RF baseband processor 704, causes the RF baseband processor 704 to perform the various functions described supra. The computer-readable medium/memory may also be used for storing data that is manipulated by the RF baseband processor 704 when executing software. The RF baseband processor 704 further includes a reception component 730, an RF sensing manager 732, and a transmission component 734. The RF sensing manager 732 includes the one or more illustrated components. The components within the RF sensing manager 732 may be stored in the computer-readable medium/memory and/or configured as hardware within the processor 704. The processor 704 may be a component of the wireless device 350 and may include the memory 360 and/or at least one of the TX processor 368, the RX processor 356, and the controller/processor 359. In one configuration, the apparatus 702 may be a modem chip and include just the RF baseband processor 704, and in another configuration, the apparatus 702 may be the entire RF sensing device (e.g., see 103, 503, the device 310 or 203, which may include the transmission unit 201a, 403a and/or reception unit 201b, 403b) and include the additional modules of the apparatus 702.

The RF sensing manager 732 includes a first beamsweep component 740 that is configured to perform a first beamsweep, e.g., as described in connection with 602 in FIG. 6. The RF sensing manager 732 further includes a measurement component 742 configured to measure a reflected signal based on the first and/or second beamsweep, e.g., as described in connection with 604 and/or 612 in FIG. 6. The RF sensing manager 732 further includes a second beamsweep component 744 that is configured to perform a second beamsweep, e.g., as described in connection with 610 in FIG. 6. The RF sensing manager 732 further includes a beam selection component 746 that is configured to select at least one beam for RF sensing, e.g., as described in connection with 614 in FIG. 6. The RF sensing manager 732 further includes a region selection component 748 that is configured to select a portion of region for the second beamsweep, e.g., as described in connection with 606 in FIG. 6. The RF sensing manager 732 further includes a beam subset selection component 750 that is configured to select a portion of region for the second beamsweep, e.g., as described in connection with 606 in FIG. 6. The RF sensing manager 732 further includes an RF signal component 752 that is configured to transmit an RF signal using the selected beam, e.g., as described in connection with 616 in FIG. 6. The RF sensing manager 732 further includes an RF sensing component 754 that is configured to perform RF sensing based on a reflected signal, e.g., as described in connection with 618 in FIG. 6.

The apparatus may include additional components that perform each of the blocks of the algorithm in the flowchart of FIG. 6. As such, each block in the flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 702, and in particular the RF baseband processor 704, includes means for means for performing a first beamsweep of an RF signal (e.g., first beamsweep component 740). The apparatus 702 includes means for measuring a reflection of the RF signal based on the first beamsweep (e.g., the measurement component 742). The apparatus 702 includes means for performing a second beamsweep of the RF signal, wherein the first beamsweep is based on a different parameter than the second beamsweep (e.g., the second beamsweep component 744). The apparatus 702 includes means for measuring the reflection of the RF signal based on the second beamsweep (e.g., the measurement component 742). The apparatus 702 includes means for selecting a beam for RF sensing based on the first beamsweep and the second beamsweep (e.g., the beam selection component 746). The apparatus may further include means for selecting a subset of beams based on measurements of the reflection of the RF signal over the first beamsweep, wherein the second beamsweep is performed over the subset of beams (e.g., the beam subset selection component 750 of the RF sensing manager 732). The apparatus 702 may further include means for selecting a portion of the region based on measurements of the reflection of the RF signal over the first beamsweep (e.g., the region selection component 748 of the RF sensing manager 732). The apparatus 702 may further include means for transmitting the RF signal with the selected beam (e.g., the RF signal component 752, the transmission component 734, and/or the RF transceiver 722). The apparatus 702 may further include means for performing the RF sensing of the reflection of the RF signal using the selected beam (e.g., RF sensing component 754 of the RF sensing manager 732). The apparatus may further include means for selecting a portion of the region based on measurements of the reflection of the RF signal over the first beamsweep (e.g., the region selection component 748 of the RF sensing manager 732). The means may be one or more of the components of the apparatus 702 configured to perform the functions recited by the means. As described supra, the apparatus 702 may include the TX Processor 368, the RX Processor 356, and the controller/processor 359. As such, in one configuration, the means may be the TX Processor 368, the RX Processor 356, and the controller/processor 359 configured to perform the functions recited by the means.

FIG. 8A illustrates an example of coarse beam detection 800 followed by fine beam detection 812. In the illustrated coarse beam detection 800, an RF sensing device 803 uses beam sweeping 810 to transmit and monitor for an RF signal over multiple beams covering a region. The RF sensing device 803 transmits the RF signal and monitors for a reflection of the transmitted RF signal. In the illustrated fine beam detection 812 (or beam refinement), the RF sensing device 803 transmits an RF signal over a portion of the region using beam sweeping 814. The portion of the region may be determined based on measurements of the reflected signal in the coarse beam detection 800. For example, in FIG. 8A, the RF sensing device 803 transmits the signal using wider beams 816a, 816b, 816c. Then, in the fine beam detection 812, the RF sensing device 803 transmits an RF signal using narrower beams 818a, 818b, 818c, 818d, 818e that cover a region based on the beam 816b identified in the coarse beam detection 800.

In some aspects, the RF sensing device 803 may perform scanning using beam sweeping 810 over multiple beams in a first step and may perform tracking using one or more fixed beams in a second step (e.g., 812). For example, the RF sensing device 803 may perform scanning to scan an environment using beams that cover a region in the first step (e.g., 810). In the second step (e.g., 812), the RF sensing device 803 may transmit the RF signal using a subset of one or more beams that cover a portion of the region determined in the first step (e.g., 810). The first step (e.g., 810) may help to determine a general region of a target, and the second step (e.g., 812) may be used to perform tracking of the target within the general region.

Although not shown in FIG. 8A, in some aspects, the RF sensing device 803 may perform short range detection in a first step and may perform long range detection in a second step. For example, the RF sensing device 803 may beam sweep an RF signal over a region using a set of wide beam in a first step to perform a shorter range detection. In a second step, the RF sensing device 803 may beam sweep over the region using a set of narrower beams to perform a longer range detection. In some examples, the beam sweep in the first step and the second step may cover substantially the same region. In some examples, the second step may beam sweep over a larger number of narrower beams than the first step.

In some aspects, the RF sensing device 803 may perform low range resolution detection in the first beam management step and may perform high range resolution detection in the second beam management step. The low range resolution detection may include a beam sweep over a region, such as shown in the first step FIG. 8A and using a narrow bandwidth, and the high range resolution detection may include a beam sweep over a limited region, such as shown in the second step of FIG. 8A and using a wide bandwidth. FIG. 8B illustrates an example of a narrower bandwidth 862 in frequency that may be used for the first step of the beam sweep over the region as part of the lower range resolution detection and an example of a wider bandwidth 860 that may be used for the second step of the beam sweep over the portion of the region as part of the higher range resolution detection.

FIG. 8C depicts an example of range resolution 880 that may be performed by the RF sensing device 803. For example, by employing the RF sensing techniques disclosed herein, the RF sensing device 803 may detect that a first target 882 is a first distance (R1) away from the RF sensing device 803 and may detect that a second target 884 is a second distance (R2) away from the RF sensing device 803. The example RF sensing device 803 (and/or a component of the RF sensing device 803) may apply Equation 1 (below) to determine the minimum range resolution that may be determined.

$$\min \Delta R = c/(2B) \quad \text{Equation 1:}$$

In Equation 1 (above), the variable "ΔR" refers to the range (or distance) resolution and may be determined as the difference in the distances (e.g., R2−R1), the variable "c" refers to the speed of light, and the variable "B" refers to bandwidth. As shown in Equation 1, range resolution (ΔR) and bandwidth (B) are inversely related. By utilizing a higher bandwidth (B) for the RF signals used to perform the RF sensing, higher range resolution (ΔR) may be achieved.

For example, FIG. 8D illustrates an example table 890 that depicts example range resolutions that may be achieved by applying different bandwidths to Equation 1. As shown in FIG. 8D, a first example row indicates that a minimum range resolution of 15 meters (m) may be achieved by utilizing a relatively small bandwidth (10 MHz) in frequency when performing RF sensing, while a second example row indicates that a minimum range resolution of 0.0375 m may be achieved by utilizing a relatively large bandwidth (4 GHz). Moreover, utilizing a smaller bandwidth (e.g., 10 MHz, 100 MHz, etc.) may be beneficial when performing the first step of the beam sweep over a region as part of the lower range resolution detection and utilizing a larger bandwidth (e.g., 900 MHz, 4 GHz, etc.) may be beneficial when performing the second step of the beam sweep over the portion of the region as part of the higher range resolution detection. The example bandwidths provided in the example table 890 of FIG. 8D are illustrative only and that other examples may utilize different bandwidths.

In various wireless communications systems, a wireless device may be configured to communicate data and/or control information with another device (e.g., a base station and/or a user equipment (UE)). For example, the wireless device and the other device may communicate using beam pair links that provide satisfactory quality for communication in a wireless communications environment. However, the wireless communications environment may change over time, which may affect the quality of the beam pair links via the wireless device and the other device communicate. For example, the path between the wireless device and the other device may be obstructed by at least one stationary or moving blocker (e.g., a wall, a tree, a human body, a vehicle, etc.) that may prevent signals from traveling between the wireless device and the other device.

Aspects presented herein provide beam management for RF sensing using multiple frequencies at an RF sensing device. According to the present disclosure, the RF sensing device may perform beam management to identify and select a beam for RF sensing in a wireless communications environment. For example, the RF sensing device may perform a sensing sweep of an RF signal using a first frequency that is frequency division multiplexed with a second, different frequency for wireless communication. The two frequencies may be within a same frequency band or may be in different frequency bands. As an example, the RF sensing device may perform a sensing sweep of an RF signal using a first carrier that is frequency division multiplexed in a frequency band with a second carrier for communication. As another example, the RF sensing device may perform a sensing sweep of an RF signal using a first frequency that is frequency division multiplexed within a same carrier with a second, different frequency for communication. In another example, the RF sensing device may perform a sensing sweep of an RF signal using a first frequency band that is frequency division multiplexed with a second frequency band for communication. The device may perform RF sensing with different frequencies, such as multiple carriers. The beam management presented herein may provide increased power savings and/or a high data rate for communications. In some examples, the selected beam may additionally or alternatively be used for communication.

Figure 9:
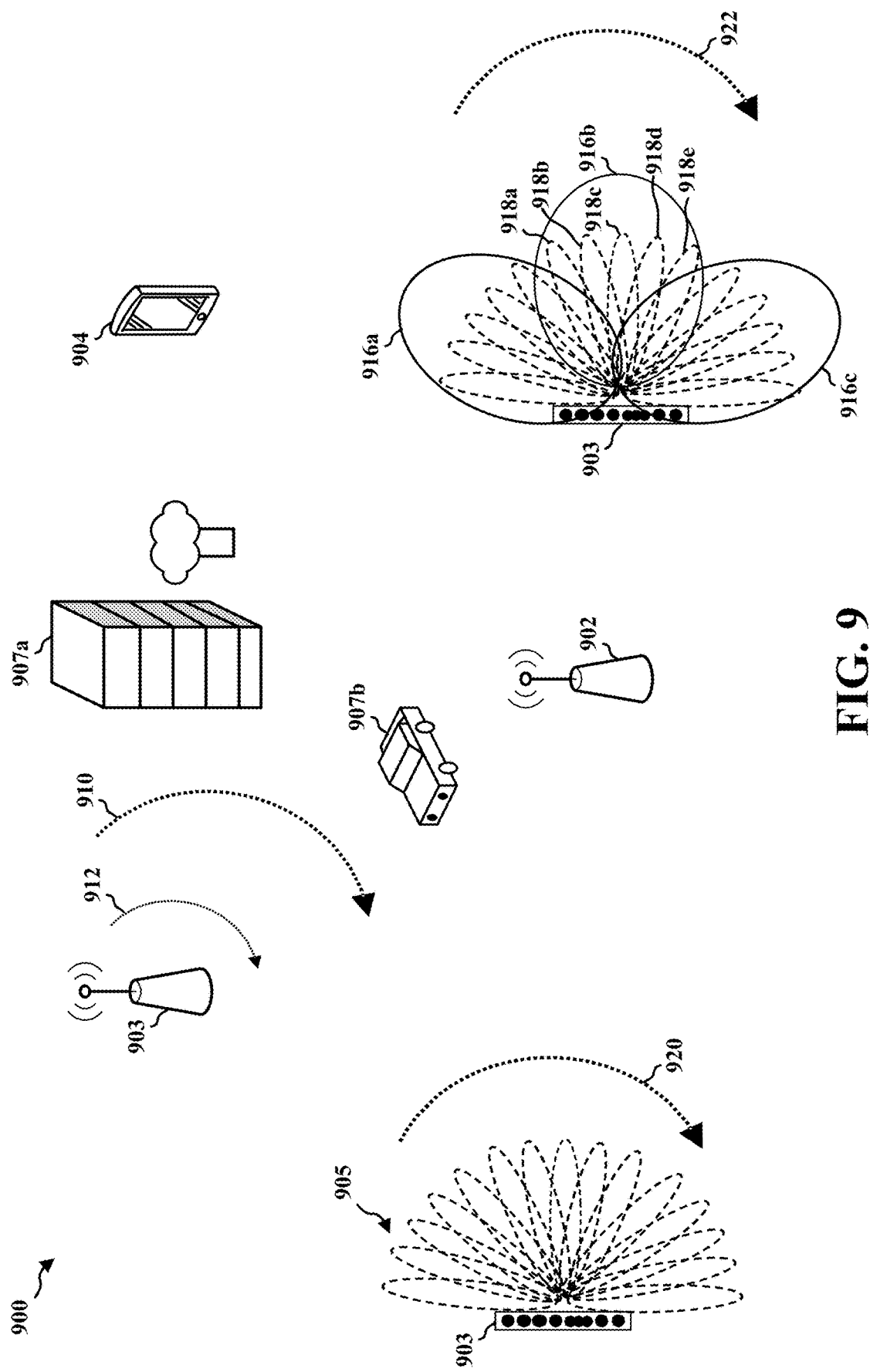
FIG. 9 is a diagram illustrating examples of RF sensing within a wireless communications environment, in accordance with various aspects of the present disclosure.

FIG. 9 is a diagram illustrating examples of RF sensing within a wireless communication environment 900, in accordance with various aspects of the present disclosure. In the illustrated example, the wireless communication environment 900 includes a base station 902, a UE 904, and an RF sensing device 903. Aspects of the base station 902 may be implemented by the base station 102/180 of FIG. 1. Aspects of the UE 904 may be implemented by the UE 104 of FIG. 1. Aspects of the RF sensing device 903 may be implemented by the RF sensing device 103, or 803 or the device 310, which may include a transmission unit 403a or 201a and/or a reception unit 403b or 201b. The RF sensing device 903 may be implemented by one or more UEs, base stations, and/or access points that are capable of RF sensing (as disclosed herein) and communication.

Although the following description provides examples of RF scanning facilitating environmental scanning of blockers (or targets), the concepts described herein may be applicable to other similar areas in which RF scanning may be beneficial. For example, the RF sensing device 903 may employ the RF sensing for health monitoring, gesture recognition, contextual information acquisition, and/or automotive tracking.

In the illustrated example of FIG. 9, the RF sensing device 903 may perform RF sensing to facilitate detection of targets, such as an example first target 907a and/or an example second target 907b. In some examples, the RF sensing device 903 may perform the RF sensing to facilitate target detection of targets, such as trees, buildings, etc., that are relatively static relative to the position of the RF sensing device 903. For example, the RF sensing device 903 may perform long-term (or occasional) scanning 910 and detect the first target 907a (e.g., a building). Performing such long-term scanning 910 may be beneficial for beam anticipation by enabling the RF sensing device 903 to consider aspects of the environment 900, for example, for communications. For example, machine-learning based beam management techniques may utilize such long-term scanning techniques to detect the presence of relatively static targets (e.g., the first target 907a) and determine beam path links for communication based on the detected presence of the relatively static targets. In some examples, such long-term scanning may be beneficial when establishing a self-organized network. For example, based on the detected relatively static targets, use of SSB beams may be optimized when establishing the self-organized network and/or for facilitating communication.

In some examples, the RF sensing device 903 may perform the RF sensing to facilitate target detection of targets, such as vehicles, etc., that are moving relative to the position of the RF sensing device 903. For example, the RF sensing device 903 may perform short-term (or real-time) scanning 912 and detect the second target 907b (e.g., a vehicle). Performing such short-term scanning 912 may be beneficial for proactive beam management that includes proactively avoiding blocking events. For example, based on a detection of a moving target (e.g., the second target 907b), a wireless device may determine to avoid a line-of-sight connection for communication. In some examples, such short-term scanning 912 may be beneficial for application-dependent sensing, such as health monitoring, gesture recognition, etc.

The relative sizes of the long-term scanning 910 and the short-term scanning 912, as shown in FIG. 9, are merely illustrative.

In some examples, the RF sensing device 903 may perform the RF sensing using one-step beam sweeping 920. For example, the RF sensing device 903 may transmit an RF signal using beams 905 and receive a reflection of the RF signal that is reflected by a target (e.g., the first target 907a and/or the second target 907b) using the same beams 905. As shown in FIG. 9, the RF sensing device 903 may perform the one-step beam sweeping 920 using narrow beams 905. In the illustrated example, the RF sensing device 903 employs fifteen narrow beams 905 to perform the one-step beam sweeping 920. When performing the one-step beam sweeping 920, the RF sensing device 903 of FIG. 9 transmits the RF signal using each of the fifteen narrow beams 905 and measures the reflection of the RF signal that is reflected by a target (if any) using the same beams 905.

As described above, in some examples, a wireless device may perform RF sensing and communication (e.g., the transmitting and/or receiving of data and/or control information). In some examples, the wireless device may utilize a first frequency (such as a first carrier, a first frequency band, etc.) for performing the RF sensing and a second frequency (such as a second carrier, a second frequency band, etc.) for performing the communication. In some examples, the wireless device may employ a shared frequency range, such as a single carrier, to perform the RF sensing and the communication. For example, the wireless device may employ time division multiplexing in a frequency band to perform the RF sensing and the communication using a single carrier or an overlapping frequency range.

FIG. 10A illustrates an example of one-step RF sensing 1000 employing time division multiplexing for sensing and communication, in accordance with various aspects of the present disclosure. In the illustrated example of FIG. 10A, an RF sensing device (e.g., the example RF sensing devices 103, 803, and/or 903 or the device 310, which may include a transmission unit 201a or 403a and/or a reception unit 201b or 403b) may use an overlapping frequency for performing RF sensing and communication. In some aspects, the overlapping frequency may include a same carrier. As shown in FIG. 10A, the RF sensing device may perform a set of beam sweeping 1002a (sometimes referred to herein as a "sensing sweep") for RF sensing at a first time (T1). In the illustrated example, the set of beam sweeping 1002a corresponds to the beams 905 of FIG. 9. For example, the RF sensing device may transmit an RF signal in a pattern using the fifteen example narrow beams 905. The RF sensing device may also measure a reflection of the RF signal based on the set of beam sweeping 1002a. At a second time (T2), the RF sensing device may use the same frequency band for a first communication 1004a. At a third time (T3), the RF sensing device may perform another set of beam sweeping 1002b for RF sensing using an overlapping frequency (e.g., a same frequency band). At a fourth time (T4), the RF sensing device may use the overlapping frequency for a second communication 1004b.

As shown in FIG. 10A, the beam sweeping for sensing 1002a, 1002b and the communication 1004a, 1004b may each be performed using an overlapping frequency (e.g., a same carrier within a frequency band). The bandwidth used for the beam sweeping 1002a or 1002b for sensing may be the same as or different than the bandwidth used for the communication 1004a or 1004b.

As described above in connection with FIG. 9, in some examples, the RF sensing device may perform long-term scanning to facilitate detecting of relatively static targets. As the sensing for such targets may be performed occasionally, it may be beneficial to use time division multiplexing of the sensing and the communication using a single carrier within a frequency band, as shown in FIG. 10A. For example, the beam sweeping 1002a, 1002b for sensing may be performed less frequently, thereby enabling the carrier to be used for communication for relatively long periods (e.g., compared to the duration for performing a beam sweep 1002a). That is, the duration for performing communication 1004a, 1004b (e.g., the interval between the time T3 and the time T2) may be long compared to the duration for performing a beam sweep 1002a (e.g., the interval between the time T2 and the time T1).

In some examples, a wireless device may utilize multiple frequencies (such as multiple carriers) for performing the RF sensing and the communication. For example, the wireless device may employ frequency division multiplexing in a frequency band to perform the RF sensing and the communication using multiple carriers.

FIG. 10B illustrates an example of one-step RF sensing 1020 employing frequency division multiplexing for sensing and communications, in accordance with various aspects of the present disclosure. In the illustrated example of FIG. 10B, an RF sensing device (e.g., the example RF sensing devices 103, 803, and/or 903, or the device 310, which may include a transmission unit 201a or 403a and/or reception unit 201b or 403b) may use different frequencies for performing RF sensing and communication. As an example, the device may use multiple carriers (e.g., different carriers) in a frequency band for performing RF sensing and communication. The device may use different frequency bands for performing RF sensing and communication. As shown in FIG. 10B, the RF sensing device may perform a first set of beam sweeping 1022a for RF sensing at a first time (T1) at a first frequency 1026. In the illustrated example, the set of beam sweeping 1022a corresponds to the beams 905 of FIG. 9. For example, the RF sensing device may transmit an RF signal in a pattern using the fifteen example narrow beams 905. The RF sensing device may also measure a reflection of the RF signal based on the set of beam sweeping 1022a. At a second time (T2), the RF sensing device may perform a second set of beam sweeping 1022b for RF sensing. At a third time (T3), the RF sensing device may perform a third set of beam sweeping 1022c for RF sensing. In the illustrated example of FIG. 10B, the RF sensing device uses a first frequency 1026 for performing the sensing sweeps 1022a, 1022b.

As shown in FIG. 10B, the RF sensing device performs communication 1024 using a second frequency 1028. Additionally, the performing of the beam sweeping 1022a, 1022b, or 1022c for sensing using the first frequency 1026 overlaps with the performing of the communication 1024 using the second frequency 1028 in time.

As an example, the first frequency 1026 and the second frequency 1028 may be different carriers within a frequency band. The first frequency 1026 may be within a first frequency band and the second frequency 1028 may be within a second frequency band, in some aspects. The beam sweeping 1022a, 1022b for sensing using the first frequency 1026 and the communication 1024 using the second frequency 1028 may be based on frequency division multiplexing. The frequency division multiplexing may be for different frequencies within a same frequency band or may be for different frequency bands.

As shown in FIG. 10B, the performing of two consecutive sensing sweeps may be separated by a zero gap or a non-zero gap. For example, the first set of beam sweeps 1022a and the second set of beam sweeps 1022b is separated by a zero gap. Additionally, the second set of beam sweeps 1022b and the third set of beam sweeps 1022c may be separated by a non-zero gap. Utilizing a non-zero gap between consecutive sensing sweeps may enable the RF sensing device to conserve power when performing RF sensing.

As described above in connection with FIG. 9, in some examples, the RF sensing device may perform short-term scanning to facilitate real-time detecting of moving targets (e.g., the second target 907b). As the sensing for such targets may be performed in real-time (or relatively frequently), it may be beneficial to use frequency division multiplexing of the sensing and the communication using multiple frequencies (such as multiple carriers within a frequency band), as shown in FIG. 10B. As an example, the beam sweeping 1022 for sensing may be performed using the first frequency 1026 and overlapping in time with the performing of the communication 1024 using the second frequency 1028, thereby enabling the RF sensing device to perform RF sensing in real-time (or relatively continuously).

Table 3 (below) depicts example aspects associated with performing one-step RF sensing using one or more carriers. For example, Table 3 includes a first option ("Option A") that corresponds to performing one-step RF sensing using one carrier. The example Table 3 also includes a second option ("Option B") that corresponds to performing one-step RF sensing using two carriers. Although the example in Table 3 is given for different carriers, the aspects may be applied for different frequencies within a same carrier, for different frequency bands, among other examples.

TABLE 3

| | Sensing | Communications | Number of Carriers | Category |
|---|---|---|---|---|
| Option A | Carrier 1 | Carrier 1 | 1 | TD |
| Option B | Carrier 1 | Carrier 2 | 2 | FD |

Option A of Table 3 may correspond to the example of one-step RF sensing 1000 employing time division multiplexing for sensing and communication (e.g., as described in connection with FIG. 10A), and that Option B of Table 3 may correspond to the example one-step RF sensing 1020 employing frequency division multiplexing for sensing and communication (e.g., as described in connection with FIG. 10B).

Referring again to the example wireless communication environment 900 of FIG. 9, in some examples, the RF sensing device 903 may perform the RF sensing using multiple-step beam sweeping 922. Aspects of performing multiple-step beam sweeping 922 are described above in connection with FIG. 8A. For example, the RF sensing device 903 may perform a first sensing step (e.g., coarse beam detection) using wide beams 916a, 916b, 916c and perform a second sensing step (e.g., fine beam detection or beam refinement) using narrow beams 918a-e. As shown in FIG. 9, each of the wide beams 916a, 916b, 916c of the first sensing step are associated with a set of narrow beams 918a-e. For example, the second wide beam 916b of FIG. 9 is associated with narrow beams 918a, 918b, 918c, 918d, 918e. In some examples, the RF sensing device 903 may perform the first sensing step periodically. For example, the RF sensing device 903 may perform the first sensing step in all available directions (e.g., the directions associated with the wide beams 916a, 916b, 916c). The RF sensing device 903 may then perform the second sensing step in specific directions. For example, the RF sensing device 903 may select a set of narrow beams 918a-e to perform the second sensing step based on one or more reflections of the RF signal that are reflected by a target when performing the first sensing step. For example, the RF sensing device 903 may perform the first sensing step and, based on a reflection of the RF signal that is reflected by the second wide beam 916b, the RF sensing device 903 may determine to use the set of narrow beams 918a-e that are associated with the second wide beam 916b. The set of narrow beams associated with a wide beam may include one or more narrow beams.

As described above, in some examples, a wireless device may perform RF sensing and communication (e.g., the transmitting and/or receiving of data and/or control information). In some examples, the wireless device may utilize multiple frequencies for performing the RF sensing and the communication. For example, the wireless device may utilize a first carrier for performing the RF sensing and a second carrier for performing the communication. The first and second carriers may be within a frequency band. In some examples, the wireless device may be capable of utilizing frequency division multiplexing of the first carrier and the second carrier. In some examples, the wireless device may be capable of utilizing time division multiplexing of the first carrier and the second carrier. In some examples, the wireless device may be capable of utilizing multiple carriers for performing the multiple-step RF sensing (e.g., the multiple-step beam sweeping 922 of FIG. 9). For example, the wireless device may utilize a first carrier for performing the first sensing step, may utilize the first carrier or a second carrier for performing the second sensing step, and may utilize the first carrier, the second carrier, or a third carrier for performing the communication. The wireless device may employ time division multiplexing and/or frequency division multiplexing for performing the RF sensing and communication.

Table 4 (below) depicts example aspects associated with performing two-step RF sensing using one or more carriers. Although the example in Table 4 is given for different carriers, the aspects may be applied for different frequencies within a same carrier, for different frequency bands, among other examples. For example, Table 4 includes a first option ("Option A") that corresponds to performing two-step RF sensing and communication using a single carrier. In some such examples, the wireless device may utilize time-division multiplexing to perform the first sensing step, the second sensing step, and the communication. Table 4 also includes another option ("Option E") that corresponds to performing two-step RF sensing and communication using three carriers. In some such examples, the wireless device may utilize frequency division multiplexing to perform the first sensing step using a first carrier ("carrier 1"), to perform the second sensing step using a second carrier ("carrier 2"), and to perform the communication using a third carrier ("carrier 3").

TABLE 4

| | 1st sensing step | 2nd sensing step | Communication | Number of Carriers | Category |
|---|---|---|---|---|---|
| Option A | Carrier 1 | Carrier 1 | Carrier 1 | 1 | TD |
| Option B | Carrier 1 | Carrier 1 | Carrier 2 | 2 | FD |
| Option C | Carrier 1 | Carrier 2 | Carrier 2 | 2 | TD + FD |
| Option D | Carrier 1 | Carrier 2 | Carrier 1 | 2 | TD + FD |
| Option E | Carrier 1 | Carrier 2 | Carrier 3 | 3 | FD |

Table 4 also illustrates three different options for performing two-step RF sensing and communication using two carriers. For example, "Option B" corresponds to performing the two-step RF sensing using a first carrier ("carrier 1") and performing the communication using a second carrier ("carrier 2"). In some such examples, the wireless device may utilize frequency division multiplexing to perform the two-step RF sensing using the first carrier and to perform the communication using the second carrier. Aspects of implementing Option B are described below in connection with FIGS. 11A and 9.

Table 4 also includes another option ("Option C") that corresponds to performing the first sensing step using a first carrier ("carrier 1") and performing the second sensing step using a second carrier ("carrier 2"). The example "Option C" also corresponds to performing communication using the second carrier ("carrier 2"). In some such examples, the wireless device may utilize time division multiplexing and frequency division multiplexing to perform the first sensing step using the first carrier and to perform the second sensing step and the communication using the second carrier. Aspects of implementing Option C are described below in connection with FIGS. 11B, 10, and 11.

Table 4 also includes another option ("Option D") that corresponds to performing the first sensing step using a first carrier ("carrier 1"), performing the second sensing step using a second carrier ("carrier 2"), and performing the communication using the first carrier ("carrier 1"). In some such examples, the wireless device may utilize time division multiplexing and frequency division multiplexing to use the first carrier for performing the first sensing step and the communication and to use the second carrier for performing the second sensing step.

FIG. 11A illustrates an example of two-step RF sensing 1100 employing frequency division multiplexing for sensing and communications, in accordance with various aspects of the present disclosure. In the illustrated example of FIG. 11A, an RF sensing device (e.g., the example RF sensing devices 103, 803, and/or 903, or the device 310, which may include a transmission unit 201a or 403a and/or a reception unit 201b or 403b) may use different frequencies for performing two-step RF sensing and communication. As shown in FIG. 11A, at a first time (T1), the RF sensing device may initiate a first sensing sweep. For example, the RF sensing device may perform a first beam sweep 1102a associated with the first sensing step. In the illustrated example, the first beam sweep 1102a corresponds to the three wide beams 916a, 916b, 916c of FIG. 9. For example, the RF sensing device may transmit an RF signal in a pattern using the three example wide beams 916a, 916b, 916c. The RF sensing device may also measure a reflection of the RF signal based on the first beam sweep 1102a. In the illustrated example, the RF sensing device performs a second beam sweep 1102b including one or more sets of narrow beams that correspond to one or more wide beam of the first beam sweep 1102a that indicate target detection. For example, based on the reflections of the RF signal detected by the RF sensing device for the first beam sweep 1102a, the RF sensing device may determine to perform the second beam sweep 1102b for the set of narrow beams 918a-e corresponding to the second wide beam 916b (e.g., the narrow beams 918a, 918b, 918c, 918d, 918e).

At a second time (T2), the RF sensing device may initiate a second sensing sweep. For example, the RF sensing device may perform a first beam sweep 1104a associated with the first sensing step. As shown in FIG. 11A, each of the three wide beams of the first beam sweep 1104a indicate target detection. Accordingly, the RF sensing device may perform a second beam sweep 1104b associated with the second sensing step including each of the respective sets of narrow beams corresponding to the wide beams of the first beam sweep 1104a.

At a third time (T3), the RF sensing device may initiate a third sensing sweep 1106a. For example, the RF sensing device may perform a first beam sweep 1106a associated with the first sensing step. As shown in FIG. 11A, each of the three wide beams of the first beam sweep 1106a did not indicate target detection. Accordingly, the RF sensing device may determine to forego (or avoid) performing a second sensing step associated with the third sensing sweep 1106a.

In the illustrated example of FIG. 11A, the RF sensing device performs the two-steps of RF sensing using a first frequency 1110. The RF sensing device may also perform communication 1108 using a second frequency 1112. As shown in FIG. 11A, the RF sensing device may perform the two-step RF sensing overlapping in time with the communication.

A two-step RF sensing that employs frequency division multiplexing of the first frequency 1110 and the second frequency 1112 for the RF sensing and communication (as shown in FIG. 11A) may be beneficial in providing power savings. For example, when performing the first sensing sweep (e.g., 1102a, b) at time T1, the RF sensing device transmits eight RF signals, and when performing the third sensing sweep 1106a at time T3, the RF sensing device transmits three RF signals. In contrast, when performing one-step RF sensing (as shown in FIG. 10B), the RF sensing device transmits fifteen RF signals for each sensing sweep. Thus, while certain two-step sensing sweeps (e.g., the second sweep 1104a, 1104b for RF sensing) may include performing more RF signal transmissions than the one-step sensing sweep, over time, power savings may be realized for the RF sensing device as the RF sensing device is unlikely to detect a target for each wide beam for each first sensing step of a sensing sweep.

FIG. 11B illustrates an example of two-step RF sensing employing time and frequency division multiplexing for sensing and communications, in accordance with various aspects of the present disclosure. In the illustrated example of FIG. 11B, an RF sensing device (e.g., the example RF sensing devices 103, 803, and/or 903, or the device 310, which may include a transmission unit 201a or 403a and/or a reception unit 201b or 403b) may use multiple frequencies in a frequency band for performing two-step RF sensing and communication. As shown in FIG. 11B, the RF sensing device employs time division multiplexing and frequency division multiplexing for sensing and communications. For example, at a first time (T1), the RF sensing device may initiate a first sensing sweep. For example, the RF sensing device may perform a first beam sweep 1152a associated with the first sensing step. In the illustrated example, the first beam sweep 1152a corresponds to the three wide beams 916a, 916b, 916c of FIG. 9. For example, the RF sensing device may transmit an RF signal in a pattern using the three example wide beams 916a, 916b, 916c. The RF sensing device may also measure a reflection of the RF signal based on the first beam sweep 1152a. In the illustrated example, the RF sensing device performs a second beam sweep 1152b including one or more sets of narrow beams that correspond to one or more wide beam of the first beam sweep 1152a that indicate target detection. For example, based on the reflections of the RF signal detected by the RF sensing device for the first beam sweep 1152a, the RF sensing device may determine to perform the second beam sweep 1152b for the set of narrow beams 918a-e corresponding to the second wide beam 916b (e.g., the narrow beams 918a, 918b, 918c, 918d, 918e).

At a second time (T2) of FIG. 11B, the RF sensing device may initiate a second sensing sweep 1154b. For example, the RF sensing device may perform a first beam sweep 1154a associated with the first sensing step. As shown in FIG. 11B, each of the three wide beams of the first beam sweep 1154a indicate target detection. Accordingly, the RF sensing device may perform a second beam sweep 1154b associated with the second sensing step including each of the respective sets of narrow beams corresponding to the wide beams of the first beam sweep 1154a.

At a third time (T3) of FIG. 11B, the RF sensing device may initiate a third sensing sweep 1156a. For example, the RF sensing device may perform a first beam sweep 1156a associated with the first sensing step. As shown in FIG. 11B, each of the three wide beams of the first beam sweep 1156a did not indicate target detection. Accordingly, the RF sensing device may determine to forego (or avoid) performing a second sensing step associated with the third sensing sweep 1156a.

In the illustrated example of FIG. 11B, the RF sensing device performs the first sensing step of a sensing sweep using a first frequency 1160. The RF sensing device performs the second sensing step of a sensing sweep and performs communication 1158 using a second frequency 1162. As shown in FIG. 11B, the RF sensing device may employ frequency division multiplexing of the first frequency 1160 and the second frequency 1162 to perform the sensing sweeps. The RF sensing device may employ time division multiplexing within the second frequency 1162 to facilitate the performing of the second sensing steps (e.g., the second beam sweeps 1152b, 1154b) and the performing of the communications 1158. For example, the RF sensing device may utilize the second frequency 1162 for communication 1158 when not performing the second sensing steps. That is, the performing of the first sensing steps (e.g., the first beam sweeps 1152a, 1154a, 1156a) may overlap with the performing of the communications 1158 in the time-domain.

A two-step RF sensing employing frequency division multiplexing of the first frequency 1160 and the second frequency 1162 for the first sensing steps and the second sensing steps (as shown in FIG. 11B) may be beneficial in providing high data rates for communications. For example, when the RF sensing device is not using the second frequency 1162 for performing the second sensing step, the RF sensing device may use the second frequency 1162 for communications 1158.

For example, when performing the first beam sweep 1152a for sensing at time T1, the RF sensing device time division multiplexes the performing of the second beam sweep 1152b with the communications 1158, and when performing the third sensing sweep 1156a at time T3, the RF sensing device forgoes performing any beam sweeps using the second frequency 1162. In contrast, when performing one-step RF sensing and employing time division multiplexing (as shown in FIG. 10A), the RF sensing device time division multiplexes the performing of fifteen RF signals for each sensing sweep. Thus, while certain two-step sensing sweeps (e.g., the second sensing sweep 1154b) may result in less time being used by the second frequency 1162 for the communications 1158 than the one-step sensing sweep, over time, high data rates for communications may be achieved by the RF sensing device as the RF sensing device is unlikely to detect a target for each wide beam for each first sensing step of a sensing sweep.

Figure 12:
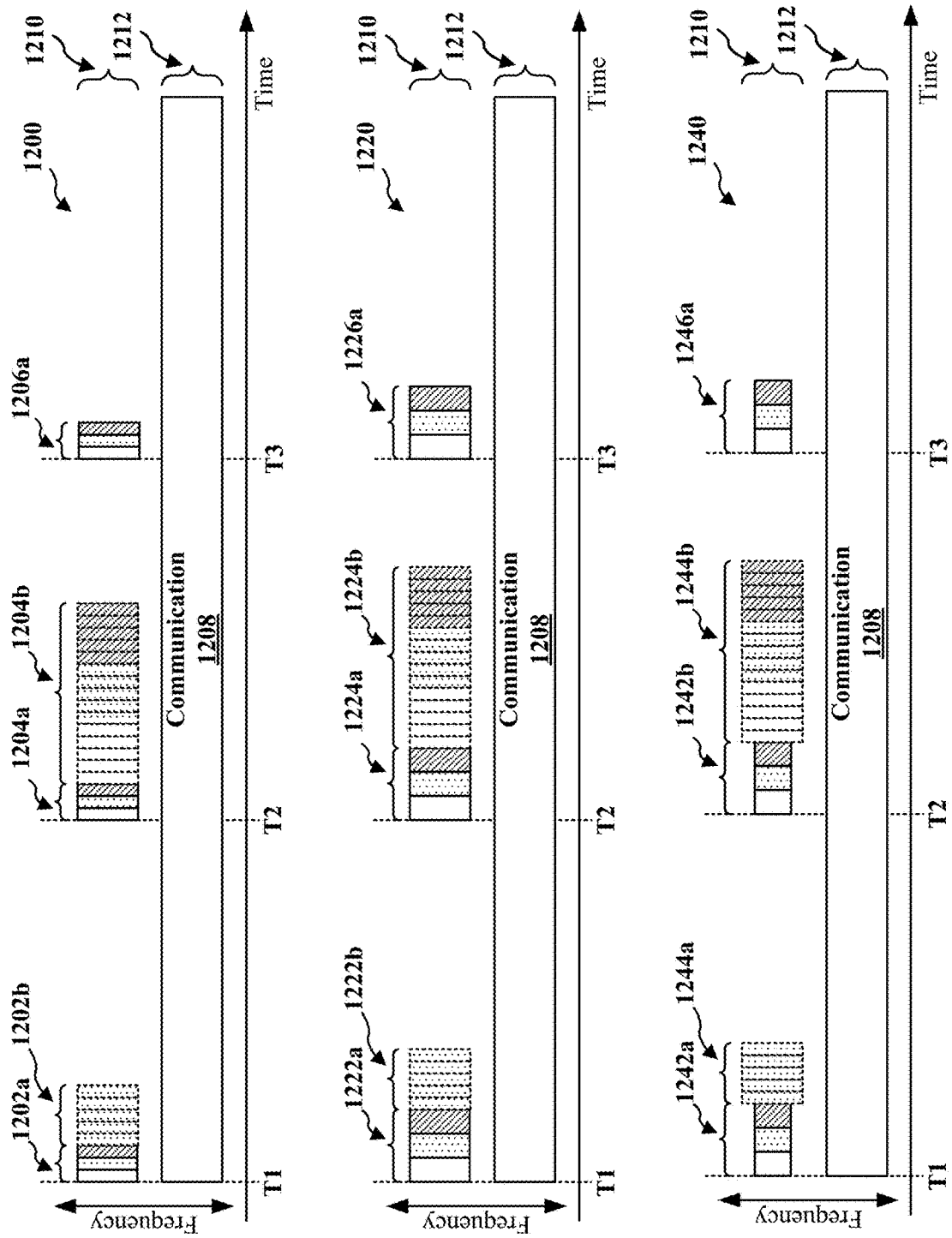
FIG. 12 illustrates examples of two-step RF sensing employing frequency division multiplexing for sensing and communications, in accordance with various aspects of the present disclosure.

FIG. 12 illustrates examples of two-step RF sensing employing frequency division multiplexing for sensing and communications, in accordance with various aspects of the present disclosure. In the illustrated examples of FIG. 12, an RF sensing device (e.g., the example RF sensing devices 103, 803, and/or 903, or the device 310, which may include a transmission unit 201a or 403a and/or a reception unit 201b or 403b) may use multiple frequencies for performing two-step RF sensing and communication. For example, FIG. 12 includes examples 1200, 1220, 1240 that correspond to Option B of Table 4. In particular, the examples 1200, 1220, 1240 of FIG. 12 illustrate performing a first sensing step and a second sensing step using a first frequency 1210 and performing communications 1208 using a second frequency 1212. Thus, the examples 1200, 1220, 1240 of FIG. 12 illustrate performing two-step RF sensing employing frequency division multiplexing for sensing and communications.

In the illustrated example of FIG. 12, a first example 1200 corresponds to the example of two-step RF sensing 1100 of FIG. 11A. For example, at a first time (T1), the RF sensing device may initiate a first sensing sweep. For example, the RF sensing device may perform a first beam sweep 1202a associated with the first sensing step. In the illustrated example, the RF sensing device performs a second beam sweep 1202b including one or more sets of narrow beams that correspond to one or more wide beam of the first beam sweep 1202a that indicate target detection. For example, based on the reflections of the RF signal detected by the RF sensing device for the first beam sweep 1202a, the RF sensing device may determine to perform the second beam sweep 1202b for the set of narrow beams 918a-e corresponding to the second wide beam 916b (e.g., the narrow beams 918a, 918b, 918c, 918d, 918e).

At a second time (T2), the RF sensing device may initiate a second sensing sweep. For example, the RF sensing device may perform a first beam sweep 1204a associated with the first sensing step. As shown in the first example 1200, each of the three wide beams of the first beam sweep 1204a indicate target detection. Accordingly, the RF sensing device may perform a second beam sweep 1204b associated with the second sensing step including each of the respective sets of narrow beams corresponding to the wide beams of the first beam sweep 1204a.

At a third time (T3), the RF sensing device may initiate a third sensing sweep 1206a. For example, the RF sensing device may perform a first beam sweep 1206a associated with the first sensing step. As shown in the first example 1200, each of the three wide beams of the first beam sweep 1206a did not indicate target detection. Accordingly, the RF sensing device may determine to forego (or avoid) performing a second sensing step associated with the third sensing sweep 1206a.

In the illustrated example of FIG. 12, a second example 1220 also corresponds to the example of two-step RF sensing 1100 of FIG. 11A. In contrast to the first example 1200, the second example 1220 utilizes a long pulse (or pulse repetition) for performing the first sensing step of a sensing sweep. For example, the signal duration for first beam sweeps 1222a, 1224a, 1226a associated with the first sensing step have a different signal duration than second beam sweeps 1222b, 1224b associated with the second sensing step. In the illustrated second example 1220, the signal duration for each wide beam of the first beam sweeps 1222a, 1224a, 1226a is relatively longer than the signal duration for each narrow beam of the second beam sweeps 1222b, 1224b.

In the illustrated example of FIG. 12, a third example 1240 also corresponds to the example of two-step RF sensing 1100 of FIG. 11A. In contrast to the first example 1200, the third example 1240 utilizes a long pulse (or pulse repetition) for performing the first sensing step of a sensing sweep and a smaller bandwidth. For example, the signal duration for first beam sweeps 1242a, 1244a, 1246a associated with the first sensing step have a different signal duration than second beam sweeps 1242b, 1244b associated with the second sensing step. In the illustrated third example 1240, the signal duration for each wide beam of the first beam sweeps 1242a, 1244a, 1246a is relatively longer than the signal duration for each narrow beam of the second beam sweeps 1242b, 1244b. In addition, the bandwidth associated with each of the wide beams of the first beam sweeps 1242a, 1244a, 1246a is relatively smaller than the bandwidth for each narrow beam of the second beam sweeps 1242b, 1244b. As described above in connection with the example of FIG. 8C and the example table of FIG. 8D, smaller bandwidth may result in lower range resolution. Thus, it may be beneficial to use larger bandwidth when performing the second beam sweeps 1242b, 1244b compared to the first beam sweeps 1242a, 1244a, 1246a.

Figure 13:
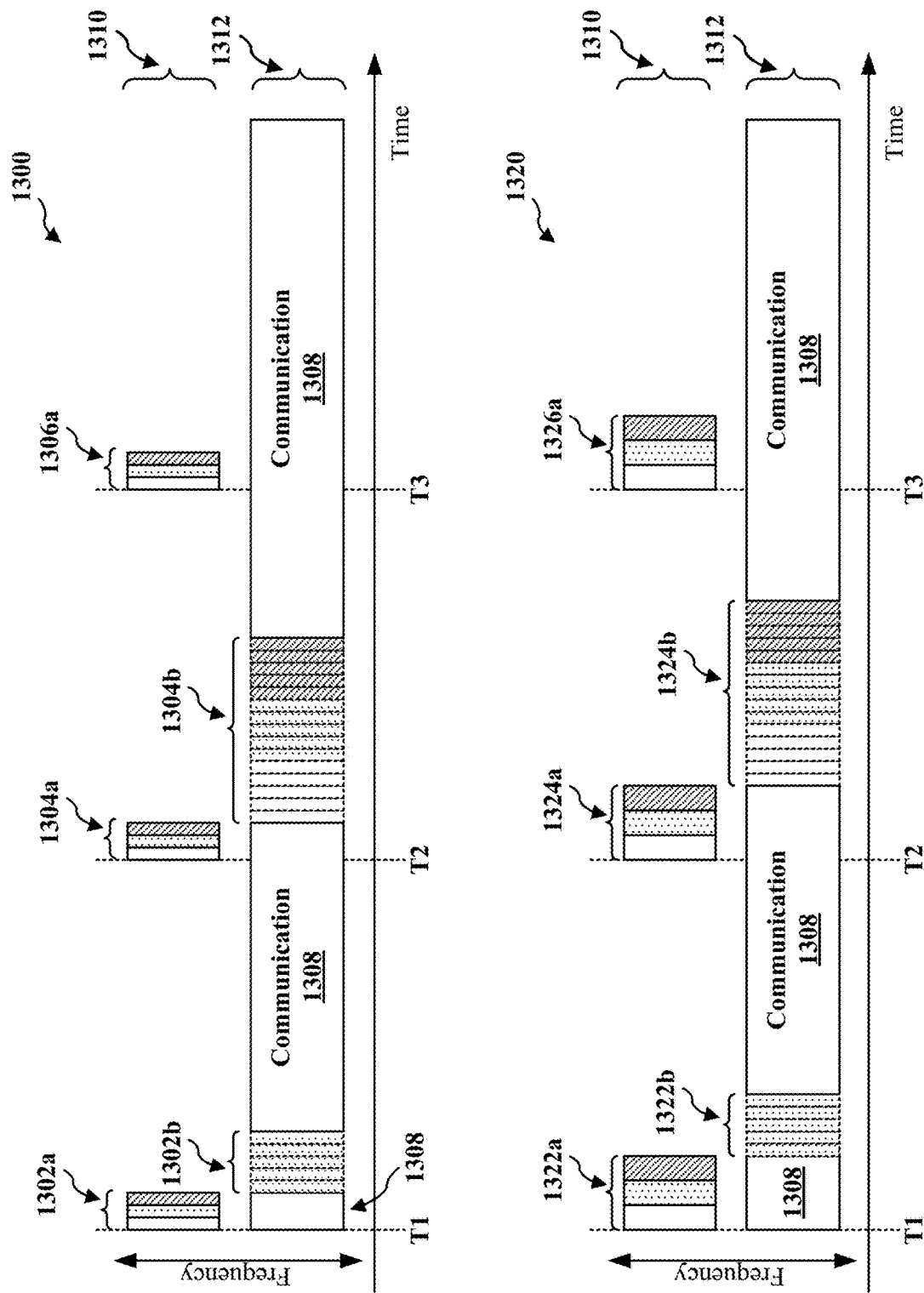
FIG. 13 illustrates examples of two-step RF sensing employing time and frequency division multiplexing for sensing and communications with similar bandwidths for two carriers, in accordance with various aspects of the present disclosure.
Figure 14:
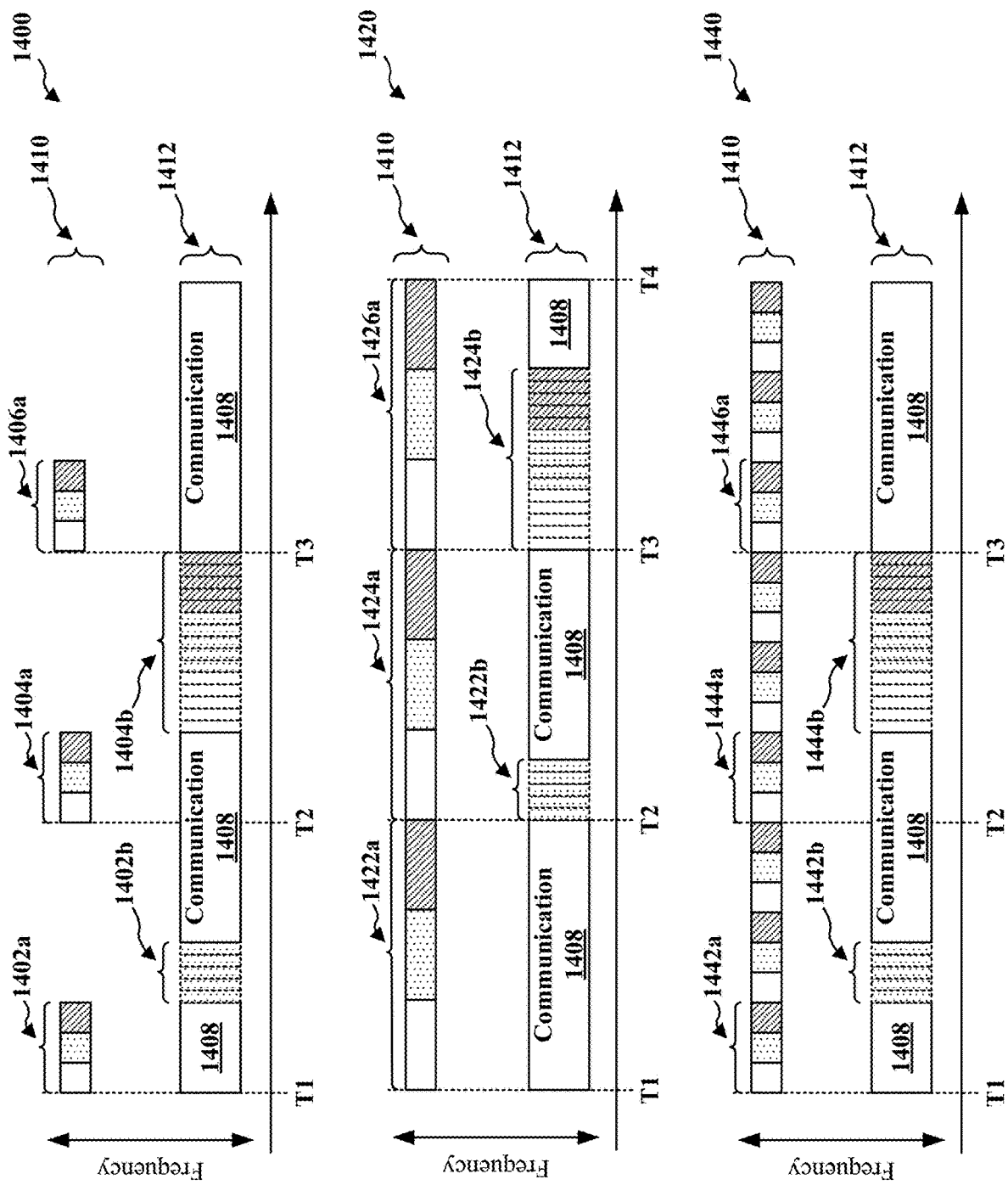
FIG. 14 illustrates examples of two-step RF sensing employing time and frequency division multiplexing for sensing and communications with different bandwidths for two carriers, in accordance with various aspects of the present disclosure.
Figure 15:
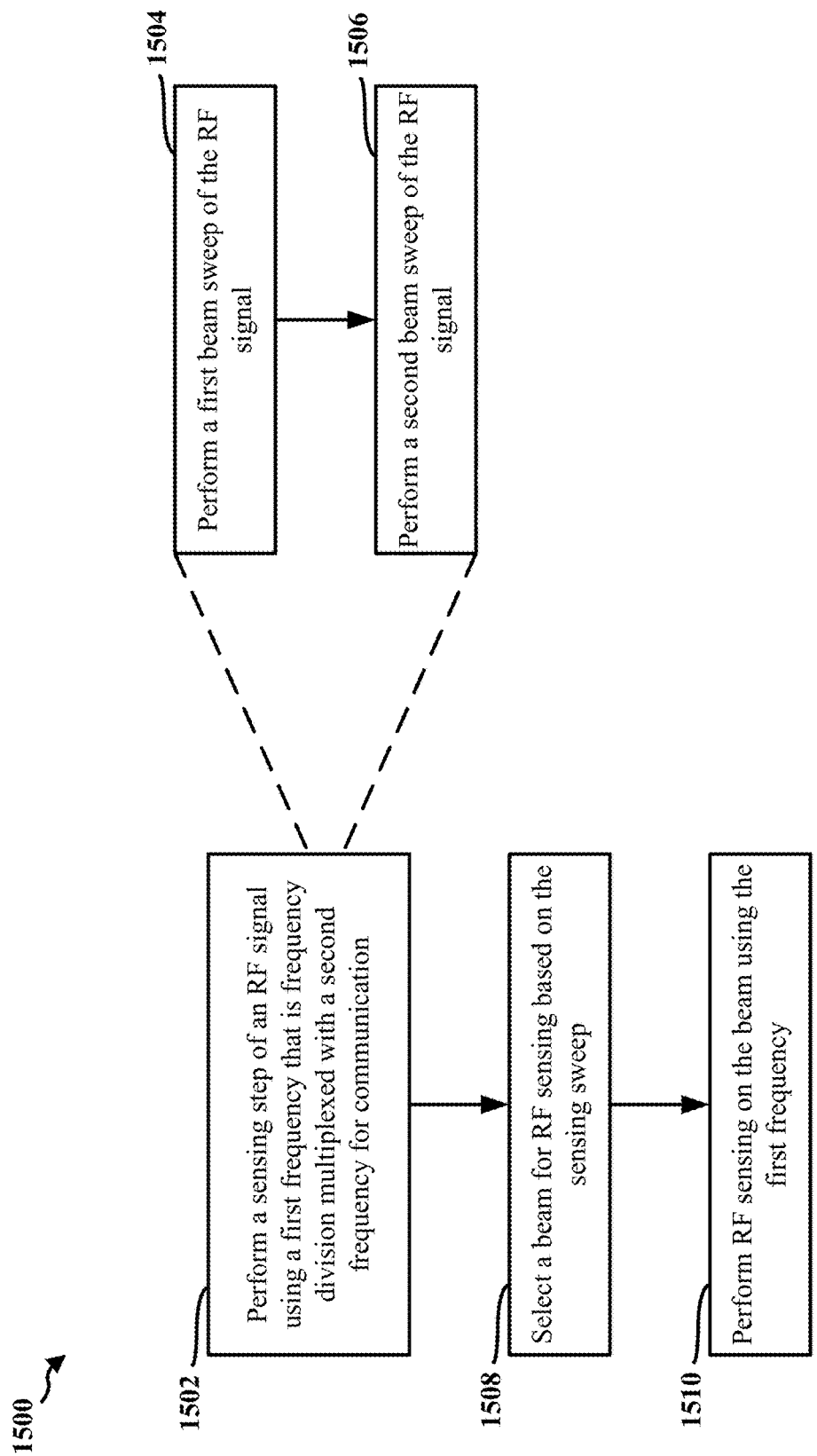
FIG. 15 is a flowchart of a method of beam management for RF sensing at a wireless device, in accordance with the teachings disclosed herein.

FIGS. 13 and 14 illustrate examples of two-step RF sensing employing time division multiplexing and frequency division multiplexing for sensing and communications, in accordance with various aspects of the present disclosure. In the illustrated examples of FIGS. 13 and 14, an RF sensing device (e.g., the example RF sensing devices 103, 803, and/or 903, or the device 310, which may include a transmission unit 201a or 403a and/or a reception unit 201b or 403b) may use multiple frequencies for performing two-step RF sensing and communication. For example, FIGS. 13 and 14 include examples that correspond to Option C of Table 4. In particular, examples 1300, 1320 of FIG. 13, and examples 1400, 1420, 1440 of FIG. 14 illustrate using a first frequency 1310, 1410 (respectively) for performing a first sensing step and using a second frequency 1312, 1412 (respectively) for performing a second sensing step and communications. Thus, the examples of FIGS. 13 and 14 illustrate performing two-step RF sensing employing time division multiplexing and frequency division multiplexing for sensing and communications.

In the illustrated examples of FIG. 13, a first example 1300 corresponds to the example of two-step RF sensing 1150 of FIG. 11B. In FIG. 13, the sensing may be multiplexed at a different frequency than wireless communication 1308 or may be time division multiplexed at an overlapping frequency with the wireless communication 1308. For example, at a first time (T1), the RF sensing device may initiate a first sensing sweep. For example, the RF sensing device may perform a first beam sweep 1302a associated with the first sensing step. In the illustrated example, the RF sensing device performs a second beam sweep 1302b including one or more sets of narrow beams that correspond to one or more wide beam of the first beam sweep 1302a that indicate target detection. For example, based on the reflections of the RF signal detected by the RF sensing device for the first beam sweep 1302a, the RF sensing device may determine to perform the second beam sweep 1302b for the set of narrow beams 918a-e corresponding to the second wide beam 916b (e.g., the narrow beams 918a, 918b, 918c, 918d, 918e).

At a second time (T2) of the first example 1300, the RF sensing device may initiate a second sensing sweep. For example, the RF sensing device may perform a first beam sweep 1304a associated with the first sensing step. As shown in the first example 1300 of FIG. 13, each of the three wide beams of the first beam sweep 1304a indicate target detection. Accordingly, the RF sensing device may perform a second beam sweep 1304b associated with the second sensing step including each of the respective sets of narrow beams corresponding to the wide beams of the first beam sweep 1304a.

At a third time (T3) of the first example 1300, the RF sensing device may initiate a third sensing sweep 1306a. For example, the RF sensing device may perform a first beam sweep 1306a associated with the first sensing step. As shown in the first example 1300 of FIG. 13, each of the three wide beams of the first beam sweep 1306a did not indicate target detection. Accordingly, the RF sensing device may determine to forego (or avoid) performing a second sensing step associated with the third sensing sweep 1306a.

In the illustrated example of FIG. 13, a second example 1320 also corresponds to the example of two-step RF sensing 1150 of FIG. 11B. In contrast to the first example 1300, the second example 1320 utilizes a long pulse (or pulse repetition) for performing the first sensing step of a sensing sweep. For example, the signal duration for first beam sweeps 1322a, 1324a, 1326a associated with the first sensing step have a different signal duration than second beam sweeps 1322b, 1324b associated with the second sensing step. In the illustrated second example 1320, the signal duration for each wide beam of the first beam sweeps 1322*a*, 1324*a*, 1326*a* is relatively longer than the signal duration for each narrow beam of the second beam sweeps 1322*b*, 1324*b*.

In the illustrated examples 1300, 1320 of FIG. 13, the first frequency 1310 and the second frequency 1312 are associated with a similar bandwidth. For example, the first frequency 1310 and the second frequency 1312 may be each associated with an FR2 signal, an FR2x signal, or an FR4 signal. In some such examples, the first sensing steps (e.g., the first beam sweeps 1302*a*, 1304*a*, 1306*a*, 1322*a*, 1324*a*, 1326*a*) may be periodic sensing in all directions and provide coarse detection of targets in terms of angle detection. Additionally, the second sensing steps (e.g., the second beam sweeps 1302*b*, 1304*b*, 1322*b*, 1324*b*) may be event-driven sensing in specific directions and provide fine detection of targets in terms of angle detection.

In the illustrated examples 1400, 1420, 1440 of FIG. 14, the first frequency 1410 and the second frequency 1412 are associated with different bandwidths. For example, the first frequency 1310 may be associated with an FR1 signal and the second frequency 1412 may be associated with an FR2 signal. Other examples may include additional or alternative combinations of signals having different bandwidths.

In the illustrated examples of FIG. 14, a first example 1400 corresponds to the example of two-step RF sensing 1150 of FIG. 11B. In FIG. 14, the sensing may be multiplexed at a different frequency than wireless communication 1408 or may be time division multiplexed at an overlapping frequency with the wireless communication 1408. As shown in FIG. 14, the first example 1400 utilizes a long pulse (or pulse repetition) for performing the first sensing step of a sensing sweep and a smaller bandwidth than the second sensing step of the sensing sweep. For example, the signal duration for first beam sweeps 1402*a*, 1404*a*, 1406*a* associated with the first sensing step have a different signal duration than second beam sweeps 1402*b*, 1404*b* associated with the second sensing step. In the illustrated first example 1400 of FIG. 14, the signal duration for each wide beam of the first beam sweeps 1402*a*, 1404*a*, 1406*a* is relatively longer than the signal duration for each narrow beam of the second beam sweeps 1402*b*, 1404*b*. In addition, the bandwidth associated with each of the wide beams of the first beam sweeps 1402*a*, 1404*a*, 1406*a* is relatively smaller than the bandwidth for each narrow beam of the second beam sweeps 1402*b*, 1404*b*. As described above in connection with the example of FIG. 8C and the example table of FIG. 8D, smaller bandwidth may result in lower range resolution. Thus, it may be beneficial to use larger bandwidth when performing the second beam sweeps 1402*b*, 1404*b* compared to the first beam sweeps 1402*a*, 1404*a*, 1406*a*.

In the illustrated example of FIG. 14, a second example 1420 also corresponds to the example of two-step RF sensing 1150 of FIG. 11B. In contrast to the first example 1400, the second example 1400 performs the first sensing step of a sensing sweep during a first period and perform the second sensing step (if any) of the sensing sweep during a subsequent period. For example, in the second example 1420, the RF sensing device may utilize long pulses (or pulse repetition) for performing a first beam sweep 1422*a* of a first sensing sweep during a first period (e.g., the interval defined by the time T1 and the time T2). The RF sensing device may then perform the corresponding second sensing step of the first sensing sweep (e.g., a second beam sweep 1422*b*) during a second period (e.g., the interval defined by the time T2 and the time T3).

Similarly, at the time T2, the RF sensing device initiates a second sensing sweep that includes performing a first beam sweep 1424*a* associated with the first sensing step during the second period (e.g., the interval defined by the time T2 and the time T3) and performing a second beam sweep 1424*b* associated with the second sensing step during a third period (e.g., the interval defined by the time T3 and the time T4).

In the illustrated example of FIG. 14, a third example 1440 also corresponds to the example of two-step RF sensing 1150 of FIG. 11B. In contrast to the first example 1400 and the second example 1420, the third example 1440 repeats the performing of the first sensing step of a sensing sweep during a first period. The RF sensing device may then perform the second sensing step (if any) of the sensing sweep after an occurrence of the first beam sweep associated with the first sensing step indicates a target detection. For example, in the third example 1440, the RF sensing device may initiate performing a first sensing sweep at time T1 including repeating the performing of a first beam sweep 1442*a* during a first period (e.g., the interval defined by the time T1 and the time T2). The RF sensing device may then perform the corresponding second sensing step of the first sensing sweep (e.g., a second beam sweep 1442*b*) after an occurrence of the first beam sweep 1442*a* indicates a target detection.

Similarly, at the time T2, the RF sensing device may initiate a second sensing sweep that includes repeating the performing of a first beam sweep 1424*a* associated with the first sensing step during the second period (e.g., the interval defined by the time T2 and the time T3) and performing the corresponding second sensing step of the second sensing sweep (e.g., a second beam sweep 1444*b*) after an occurrence of the first beam sweep 1444*a* indicates a target detection.

FIG. 15 is a flowchart 1500 of a method of beam management for radio frequency (RF) sensing at a wireless device. The method may be performed by an RF sensing device (e.g., 103, 803, and/or 903; the device 310; the transmission unit 201*a* or 403*a* and/or the reception unit 201*b* or 403*b*; the apparatus 1602). The method may help to improve beam management for monostatic RF sensing through multiple frequencies.

At 1502, the wireless device performs a sensing step of an RF signal using a first frequency that is frequency division multiplexed with a second frequency for communication. In some aspects, the first frequency may be a first carrier and the second frequency may be a second carrier in a same frequency band. In some aspects, the first frequency and the second frequency may be different frequencies within a same carrier. In some aspects, the first frequency and the second frequency may be in different frequency bands. The sensing may include any of the aspects described in connection with, for example, 810 of FIG. 8A, 1002*a*, 1002*b* of FIG. 10A, 1022*a*, 1022*b*, 1022*c* of FIG. 10B, 1102*a*, 1102*b*, 1104*a*, 1104*b*, 1106*a* of FIG. 11A, 1152*a*, 1152*b*, 1154*a*, 1154*b*, 1156*a* of FIG. 11B, 1202*a*, 1202*b*, 1204*a*, 1204*b* 1206*a*, 1222*a*, 1222*b*, 1224*a*, 1224*b*, 1226*a*, 1242*a*, 1242*b*, 1244*a*, 1244*b*, 1246*a* of FIG. 12, 1302*a*, 1302*b*, 1304*a*, 1304*b*, 1306*a*, 1322*a*, 1322*b*, 1324*a*, 1324*b*, 1326*a* of FIG. 13, 1402*a*, 1402*b*, 1404*a*, 1404*b*, 1406*a*, 1422*a*, 1422*b*, 1424*a*, 1424*b*, 1426*a*, 1442*a*, 1444*b*, 1444*a*, 1444*b*, 1446*a* of FIG. 14. The sensing step may be performed, for example, by a sensing step component 1640 of the apparatus 1602 of FIG. 16.

In some examples, the sensing sweep may be performed by scanning a set of beams using the first frequency that is different than the second frequency for communication. In some examples, the sensing sweep may be performed periodically. In some examples, the performing of two consecutive sensing sweeps may be separated by a non-zero gap and overlap in time with the communication, as described above in connection with the performing of the second set of beam sweeps 1022b and the performing of the third set of beam sweeps 1022c of FIG. 10B. In some examples, the performing of two consecutive sensing sweeps may be separated by a zero gap and overlap in time with the communication, as described above in connection with the performing of the first set of beam sweeps 1022a and the performing of the second set of beam sweeps 1022b of FIG. 10B

In some examples, the sensing sweep may be performed for at least one of real-time tracking of a target, beam management to avoid blocking events, or application-dependent sensing. In some such examples, the target may be a fast-moving object relative to the wireless device.

At 1508, the wireless device selects a beam for RF sensing based on the sensing sweep. The selection may be performed, for example, by a beam selection component 1646 of the apparatus 1602 of FIG. 16. In some examples, the wireless device may select more than one beam.

At 1510, the wireless device performs RF sensing on the beam using the first frequency. The performing of the RF sensing may be performed, for example, by an RF sensing component 1648 of the apparatus 1602 of FIG. 16. The wireless device may perform monostatic RF sensing including any of the aspects described in connection with FIG. 2A. After receiving the RF sensing signal, the receiver can estimate Doppler related metrics, for example, of the signal between the wireless device and a target object. The RF sensing may be used to obtain a distance, speed, direction, etc. of the target.

In some examples, the wireless device may perform two-step RF sensing. For example, at 1504, the wireless device may perform a first beam sweep of the RF signal, as described above in connection with, for example, 810 of FIG. 8A, 1102a, 1104a, 1106a of FIG. 11A, 1152a, 1154a, 1156a of FIG. 11B, 1202a, 1204a, 1206a, 1222a, 1224a, 1226a, 1242a, 1244a, 1246a of FIG. 12, 1302a, 1304a, 1306a, 1322a, 1324a, 1326a of FIG. 13, 1402a, 1404a, 1406a, 1422a, 1424a, 1426a, 1442a, 1444a, 1446a of FIG. 14. The performing of the first beam sweep may be performed, for example, by a first beam sweep component 1642 of the apparatus 1602 of FIG. 16.

At 1506, the wireless device may perform a second beam sweep of the RF signal, as described above in connection with, for example, 812 of FIG. 8A, 1102b, 1104b of FIG. 11A, 1152b, 1154b of FIG. 11B, 1202b, 1204b, 1222b, 1224b, 1242b, 1244b of FIG. 12, 1302b, 1304b, 1322b, 1324b of FIG. 13, 1402b, 1404b, 1422b, 1424b, 1442b, 1444b of FIG. 14. The performing of the second beam sweep may be performed, for example, by a second beam sweep component 1644 of the apparatus 1602 of FIG. 16.

In some examples, the performing of the second beam sweep may be based at least in part on a measurement of a reflection of the RF signal when performing the first beam sweep. In some examples, the selecting of the beam for RF sensing may be based on the first beam sweep and the second beam sweep.

In some examples, the first beam sweep may be performed with a set of wide beams, and each wide beam of the set of wide beams may be associated with a respective set of narrow beams comprising one or more narrow beams with a narrower bandwidth than the wide beams of the set of wide beams.

In some examples, the first beam sweep may be performed periodically and the second beam sweep may be performed for a set of narrow beams when a target is detected using a wide beam corresponding to the respective set of narrow beams during the first beam sweep.

In some examples, the first beam sweep may be performed using the first frequency and the second beam sweep may be performed using the first frequency, as described above in connection with, for example, the example of two-step RF sensing 1100 of FIG. 11A.

In some examples, the first beam sweep may be performed with a different signal duration than the second beam sweep, and the second beam sweep is performed after the first beam sweep is completed, as described above in connection with, for example, the example 1220 of FIG. 12. In some such examples, the first beam sweep may be performed with a longer signal duration in a time domain than the second beam sweep.

In some examples, the first beam sweep may be performed with a narrower bandwidth than the second beam sweep, as described above in connection with, for example, the example 1240 of FIG. 12.

In some examples, the first beam sweep may be performed using the first frequency and the second beam sweep may be performed using the second frequency, as described above in connection with, for example, the example of two-step RF sensing 1150 of FIG. 11B. In some such examples, the second frequency used to perform the second beam sweep may be the same as the second frequency used for communication.

In some examples, the first frequency may be associated with a similar bandwidth size as the second frequency, as described above in connection with, for example, the examples 1300, 1320 of FIG. 13. In some such examples, the first beam sweep and the second beam sweep may be performed for angle detection of a target relative to the wireless device.

In some examples, the first beam sweep may be performed with a longer signal duration in a time domain than the second beam sweep, and the second beam sweep may be performed after the first beam sweep is completed, as described above in connection with, for example, the example 1320 of FIG. 13.

In some examples, the first frequency may be associated with a smaller bandwidth size than the second frequency, as described above in connection with, for example, the examples 1400, 1420, 1440 of FIG. 14. In some such examples, the first beam sweep and the second beam sweep may be performed for angle and range detection of a target relative to the wireless device.

In some examples, the first beam sweep may be performed with a longer signal duration in a time domain than the second beam sweep, and the second beam sweep may be performed after the first beam sweep is completed and during a same period as the first beam sweep, as described above in connection with, for example, the example 1400 of FIG. 14.

In some examples, the first beam sweep may be performed with a longer signal duration in a time domain than the second beam sweep, a first occurrence of the first beam sweep may be performed during a first period, a second occurrence of the first beam sweep may be performed during a second period following the first period, and an occurrence of the second beam sweep associated with the first occurrence of the first beam sweep may be performed during the second period, as described above in connection with, for example, the example 1420 of FIG. 14.

In some examples, the first beam sweep may be performed with a longer signal duration in a time domain than the second beam sweep, a plurality of occurrences of the first beam sweep may be performed during a first period, and an occurrence of the second beam sweep associated with an occurrence of the first beam sweep may be performed during the first period, as described above in connection with, for example, the example 1440 of FIG. 14.

Figure 16:
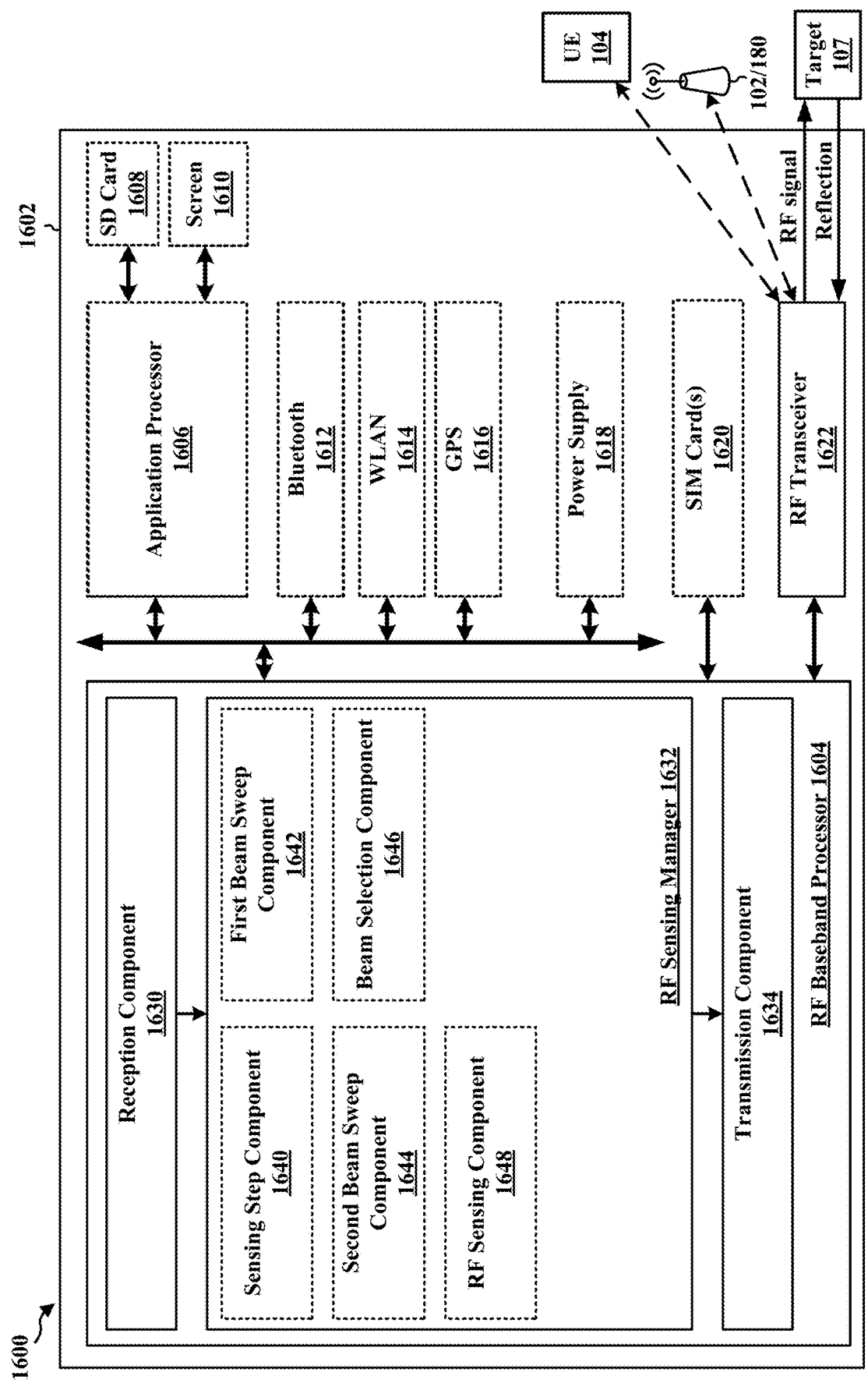
FIG. 16 is a diagram illustrating an example of a hardware implementation for an example apparatus, in accordance with the teachings disclosed herein.

FIG. 16 is a diagram 1600 illustrating an example of a hardware implementation for an apparatus 1602. The apparatus 1602 is an RF sensing device and includes an RF baseband processor 1604 (also referred to as a modem) coupled to an RF transceiver 1622. In some examples, the apparatus 1602 may be capable of wireless communication in addition to RF sensing. For example, the apparatus 1602 may be a UE, a base station, or another access point that is capable of RF sensing. If the RF sensing device is a UE, the RF baseband processor 1604 may be coupled to one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, and a power supply 1618. The RF baseband processor 1604 communicates through the RF transceiver 1622 with the UE 104 and/or the base station 102/180. The RF baseband processor 1604 performs RF sensing through the RF transceiver 1622 and may detect the target 107. The RF baseband processor 1604 may include a computer-readable medium/memory. The computer-readable medium/memory may be non-transitory. The RF baseband processor 1604 is responsible for general processing, including the execution of software stored on the computer-readable medium/memory. The software, when executed by the RF baseband processor 1604, causes the RF baseband processor 1604 to perform the various functions described supra. The computer-readable medium/memory may also be used for storing data that is manipulated by the RF baseband processor 1604 when executing software. The RF baseband processor 1604 further includes a reception component 1630, a RF sensing manager 1632, and a transmission component 1634. The RF sensing manager 1632 includes the one or more illustrated components. The components within the RF sensing manager 1632 may be stored in the computer-readable medium/memory and/or configured as hardware within the RF baseband processor 1604. The RF baseband processor 1604 may be a component of the first wireless device 310 and may include the memory 376 and/or at least one of the TX processor 316, the RX processor 370, and the controller/processor 375. In one configuration, the apparatus 1602 may be a modem chip and include just the RF baseband processor 1604, and in another configuration, the apparatus 1602 may be the entire RF sensing device (e.g., see the 103, 803, and/or 903, or the device 310, which may include a transmission unit 201a or 403a and/or a reception unit 201b or 403b) and include the additional modules of the apparatus 1602.

The RF sensing manager 1632 may include a sensing step component 1640, a first beam sweep component 1642, a second beam sweep component 1644, a beam selection component 1646, and/or an RF sensing component 1648 that may be configured to perform the aspects described in connection with FIG. 15.

The apparatus may include additional components that perform each of the blocks of the algorithm in the flowchart of FIG. 15. As such, each block in the flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the RF baseband processor 1604, includes means for performing any of the aspects of the method of FIG. 15. The means may be one or more of the components of the apparatus 1602 configured to perform the functions recited by the means. As described supra, the apparatus 1602 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means."

As such, no claim element is to be construed as a means plus function unless the element is expressly recited using the phrase "means for."

The following aspects are illustrative only and may be combined with other aspects or teachings described herein, without limitation.

Aspect 1 is a method of beam management for radio frequency (RF) sensing at a wireless device, comprising: performing a first beamsweep of an RF signal; measuring a reflection of the RF signal based on the first beamsweep; performing a second beamsweep of the RF signal, wherein the first beamsweep is based on a different parameter than the second beamsweep; measuring the reflection of the RF signal based on the second beamsweep; and selecting a beam for RF sensing based on the first beamsweep and the second beamsweep.

In aspect 2, the method of aspect 1 further includes transmitting the RF signal with the selected beam; and performing the RF sensing of the reflection of the RF signal using the selected beam.

In aspect 3, the method of aspect 1 or aspect 2 further includes that the first beamsweep is performed over a region, the method further comprising: selecting a portion of the region based on measurements of the reflection of the RF signal over the first beamsweep, wherein the second beamsweep is performed over the portion of the region.

In aspect 4, the method of any of aspects 1-3 further includes that the first beamsweep is performed over a set of beams, the method further comprising: selecting a subset of beams based on measurements of the reflection of the RF signal over the first beamsweep, wherein the second beamsweep is performed over the subset of beams.

In aspect 5, the method of any of aspects 1-3 further includes that first beamsweep is performed over a set of beams or a region, and the second beamsweep is performed over a subset of beams or a portion of the region based on measurements of the reflection of the RF signal over the first beamsweep.

In aspect 6, the method of any of aspects 1-5 further includes that the first beamsweep is based on a different range than the second beamsweep.

In aspect 7, the method of any of aspects 1-5 further includes that the first beamsweep and the second beamsweep have a different range.

In aspect 8, the method of any of aspects 1-7 further includes that the first beamsweep has a shorter range parameter than the second beamsweep.

In aspect 9, the method of any of aspects 1-8 further includes that the first beamsweep is performed with a wider beam than the second beamsweep.

In aspect 10, the method of any of aspects 1-8 further includes that the first beamsweep is performed with a set of wider beams than the second beamsweep.

In aspect 11, the method of aspect 10 further includes that each wide beam of the set of wider beams for the first beamsweep is associated with a respective set of narrower beams for the second beamsweep comprising one or more narrower beams with a narrower beamwidth than the wide beam.

In aspect 12, the method of any of aspects 1-11 further includes that the first beamsweep and the second beamsweep have a different range resolution.

In aspect 13, the method of any of aspect 12 further includes that the first beamsweep has a lower range resolution parameter than the second beamsweep.

In aspect 14, the method of any of aspects 1-13 further includes that the first beamsweep is performed with a narrower bandwidth than the second beamsweep.

In aspect 15, the method of any of aspects 1-14 further includes that the first beamsweep is performed over a region, the method further comprising: selecting a portion of the region based on measurements of the reflection of the RF signal over the first beamsweep, wherein the second beamsweep is performed over the portion of the region.

In aspect 16, the method of any of aspects 1-15 further includes that the first beamsweep is performed with a different transmission power than the second beamsweep.

In aspect 17, the method of any of aspects 1-16 further includes that the first beamsweep is performed with a higher transmission power than the second beamsweep.

In aspect 18, the method of any of aspects 1-17 further includes that the first beamsweep is performed with a different transmission power per tone, or per subcarrier, and a different bandwidth than the second beamsweep.

In aspect 19, the method of any of aspects 1-18 further includes that the first beamsweep is performed with a higher transmission power per tone, or per subcarrier, than the second beamsweep and a narrower bandwidth than the second beamsweep.

In aspect 20, the method of any of aspects 1-19 further includes that the first beamsweep is performed with a different signal duration than the second beamsweep.

In aspect 21, the method of aspect 20 further includes that the first beamsweep is performed with a longer signal duration in a time domain than the second beamsweep.

In aspect 22, the method of any of aspects 1-21 further includes that at least one of the first beamsweep or the second beamsweep is based on frequency division multiplexing with a frequency for wireless communication.

In aspect 23, the method of aspect 22 further includes that the at least one of the first beamsweep or the second beamsweep is performed by scanning a set of beams using a first frequency that is different than a second frequency for the wireless communication.

In aspect 24, the method of aspect 22 further includes that two consecutive sensing sweeps are separated by a non-zero gap and overlapping in time with the wireless communication.

In aspect 25, the method of aspect 22 further includes that two consecutive sensing sweeps are separated by a non-zero gap and not overlapping in time with the wireless communication.

In aspect 26, the method of aspect 22 further includes that two consecutive sensing sweeps are separated by a zero gap and overlapping in time with the wireless communication.

In aspect 27, the method of any of aspects 1-26 further includes that the first beam sweep is performed periodically and the second beam sweep is performed in response to detection of a target during the first beam sweep.

In aspect 28, the method of aspect 27 further includes that the first beam sweep is performed using the first carrier and the second beam sweep is performed using the first carrier.

In aspect 29, the method of aspect 27 further includes that the first beam sweep is performed using the first carrier and the second beam sweep is performed using the second carrier.

In aspect 30, the method of aspect 29 further includes that the second carrier used to perform the second beam sweep is the same as the second carrier used for communication.

Aspect 31 is a device including one or more processors and one or more memories in electronic communication with the one or more processors storing instructions executable by the one or more processors to cause the device to implement a method as in any of aspects 1-30.

In aspect 32, the device of aspect 31 further includes a transceiver coupled to the one or more processors and the one or more memories.

Aspect 33 is a system or apparatus including means for implementing a method or realizing an apparatus as in any of aspects 1-30.

Aspect 34 is a non-transitory computer readable medium storing instructions executable by one or more processors to cause the one or more processors to implement a method as in any of aspects 1-30.

Aspect 35 is a method of beam management for radio frequency (RF) sensing at a wireless device, comprising: performing a sensing sweep of an RF signal using a first carrier that is frequency division multiplexed in a frequency band with a second carrier for communication; selecting a beam for RF sensing based on the sensing sweep; and performing RF sensing on the beam using the first carrier.

In aspect 36, the method of aspect 35 further includes that the sensing sweep is performed by scanning a set of beams using the first carrier that is different than the second carrier for communication.

In aspect 37, the method of any of aspect 35 or aspect 36 further includes that the sensing sweep is performed periodically.

In aspect 38, the method of any of aspects 35 to 37 further includes that performing two consecutive sensing sweeps is separated by a non-zero gap and overlaps in time with the communication.

In aspect 39, the method of any of aspects 35 to 38 further includes that performing two consecutive sensing sweeps is separated by a zero gap and overlaps in time with the communication.

In aspect 40, the method of any of aspects 35 to 39 further includes that the sensing sweep is performed for at least one of real-time tracking of a target, beam management to avoid blocking events, or application-dependent sensing.

In aspect 41, the method of any of aspects 35 to 40 further includes that the target is a fast-moving object relative to the wireless device.

In aspect 42, the method of any of aspects 35 to 41 further includes that performing the sensing sweep comprises: performing a first beam sweep of the RF signal; performing a second beam sweep of the RF signal based at least in part on a measurement of a reflection of the RF signal when performing the first beam sweep, and wherein selecting the beam for RF sensing is based on the first beam sweep and the second beam sweep.

In aspect 43, the method of any of aspects 35 to 42 further includes that the first beam sweep is performed with a set of wide beams, and each wide beam of the set of wide beams being associated with a respective set of narrow beams comprising one or more narrow beams with a narrower bandwidth than the wide beams of the set of wide beams.

In aspect 44, the method of any of aspects 35 to 43 further includes that the first beam sweep is performed periodically and the second beam sweep is performed for a set of narrow beams when a target is detected using a wide beam corresponding to the respective set of narrow beams during the first beam sweep.

In aspect 45, the method of any of aspects 35 to 44 further includes that the first beam sweep is performed using the first carrier and the second beam sweep is performed using the first carrier.

In aspect 46, the method of any of aspects 35 to 45 further includes that the first beam sweep is performed with a different signal duration than the second beam sweep, and the second beam sweep is performed after the first beam sweep is completed.

In aspect 47, the method of any of aspects 35 to 46 further includes that the first beam sweep is performed with a longer signal duration in a time domain than the second beam sweep.

In aspect 48, the method of any of aspects 35 to 47 further includes that the first beam sweep is performed with a narrower bandwidth than the second beam sweep.

In aspect 49, the method of any of aspects 35 to 48 further includes that the first beam sweep is performed using the first carrier and the second beam sweep is performed using the second carrier.

In aspect 50, the method of any of aspects 35 to 15 further includes that the second carrier used to perform the second beam sweep is the same as the second carrier used for communication.

In aspect 51, the method of any of aspects 35 to 50 further includes that the first carrier is associated with a similar bandwidth size as the second carrier.

In aspect 52, the method of any of aspects 35 to 51 further includes that the first beam sweep and the second beam sweep are performed for angle detection of a target relative to the wireless device.

In aspect 53, the method of any of aspects 35 to 52 further includes that the first beam sweep is performed with a longer signal duration in a time domain than the second beam sweep, and the second beam sweep is performed after the first beam sweep is completed.

In aspect 54, the method of any of aspects 35 to 53 further includes that the first carrier is associated with a smaller bandwidth size than the second carrier.

In aspect 55, the method of any of aspects 35 to 54 further includes that the first beam sweep and the second beam sweep are performed for angle and range detection of a target relative to the wireless device.

In aspect 56, the method of any of aspects 35 to 55 further includes that the first beam sweep is performed with a longer signal duration in a time domain than the second beam sweep, and the second beam sweep is performed after the first beam sweep is completed and during a same period as the first beam sweep.

In aspect 57, the method of any of aspects 35 to 56 further includes that the first beam sweep is performed with a longer signal duration in a time domain than the second beam sweep, a first occurrence of the first beam sweep is performed during a first period, a second occurrence of the first beam sweep is performed during a second period following the first period, and wherein an occurrence of the second beam sweep associated with the first occurrence of the first beam sweep is performed during the second period.

In aspect 58, the method of any of aspects 35 to 57 further includes that the first beam sweep is performed with a longer signal duration in a time domain than the second beam sweep, a plurality of occurrences of the first beam sweep is performed during a first period, and an occurrence of the second beam sweep associated with an occurrence of the first beam sweep is performed during the first period.

Aspect 59 is a device including one or more processors and one or more memories in electronic communication with the one or more processors storing instructions executable by the one or more processors to cause a system or an apparatus to implement a method as in any of aspects 35 to 58.

In aspect 60, the device of aspect 59 further includes a transceiver.

Aspect 61 is a system or apparatus including means for implementing a method or realizing an apparatus as in any of aspects 35 to 58.

In aspect 62, the system or apparatus of aspect 61 further includes a transceiver.

Aspect 63 is a non-transitory computer-readable medium storing instructions executable by one or more processors to cause the one or more processors to implement a method as in any of aspects 35 to 58.

What is claimed is:

1. An apparatus for beam management for radio frequency (RF) sensing at a wireless device, comprising:
   memory; and
   at least one processor coupled to the memory and configured to:
      perform a first beamsweep of an RF signal;
      measure a reflection of the RF signal based on the first beamsweep;
      perform a second beamsweep of the RF signal using at least one different parameter than used for the first beamsweep, wherein the first beamsweep is further based on a different transmission parameter than the second beamsweep, wherein the different transmission parameter causes a measurement of the second beamsweep to have a closer minimum required reception signal to noise ratio (SNR) to the first beamsweep;
      measure the reflection of the RF signal based on the second beamsweep; and
      select a beam for RF sensing based on the first beamsweep and the second beamsweep.

2. The apparatus of claim 1, wherein the at least one processor is further configured to:
   transmit the RF signal with the selected beam; and
   perform the RF sensing of the reflection of the RF signal using the selected beam.

3. The apparatus of claim 1, wherein the first beamsweep is performed over a region, wherein the at least one processor is further configured to:
   select a portion of the region based on measurements of the reflection of the RF signal over the first beamsweep and to perform the second beamsweep over the portion of the region, wherein use of the portion of the region corresponds to the at least one different parameter for the second beamsweep.

4. The apparatus of claim 1, wherein the at least one processor is configured to perform the first beamsweep over a set of beams or a region, and to perform the second beamsweep over a subset of beams or a portion of the region based on measurements of the reflection of the RF signal over the first beamsweep, wherein use of the subset of beams or the portion of the region corresponds to the at least one different parameter for the second beamsweep.

5. The apparatus of claim 1, wherein the at least one processor is configured to perform the first beamsweep based on a different range than the second beamsweep, wherein the different range corresponds to the at least one different parameter for the second beamsweep.

6. The apparatus of claim 5, wherein the first beamsweep has a shorter range parameter than the second beamsweep.

7. The apparatus of claim 1, wherein the at least one processor is configured to perform the first beamsweep with a set of wider beams than the second beamsweep, wherein a narrower beam width corresponds to the at least one different parameter for the second beamsweep.

8. The apparatus of claim 7, wherein each wide beam of the set of wider beams for the first beamsweep is associated with a respective set of narrower beams for the second beamsweep comprising one or more narrower beams with a narrower beamwidth than a respective wide beam.

9. The apparatus of claim 1, wherein the first beamsweep and the second beamsweep have a different range resolution, wherein the different range resolution corresponds to the at least one different parameter for the second beamsweep.

10. The apparatus of claim 9, wherein the first beamsweep has a lower range resolution parameter than the second beamsweep.

11. The apparatus of claim 1, wherein the at least one processor is configured to perform the first beamsweep with a narrower bandwidth than the second beamsweep, wherein use of a wider bandwidth corresponds to the at least one different parameter for the second beamsweep.

12. The apparatus of claim 1, wherein for the different transmission parameter, the at least one processor is configured to perform the first beamsweep with a different transmission power than the second beamsweep to cause the measurement of the second beamsweep to have the closer minimum required reception SNR to the first beamsweep.

13. The apparatus of claim 12, wherein for the different transmission parameter, the at least one processor is configured to perform the first beamsweep with a higher transmission power than the second beamsweep.

14. The apparatus of claim 1, wherein for the different transmission parameter, the at least one processor is configured to perform the first beamsweep with a different transmission power per subcarrier and a different bandwidth than the second beamsweep to cause the measurement of the second beamsweep to have the closer minimum required reception SNR to the first beamsweep.

15. The apparatus of claim 14, wherein for the different transmission parameter, the at least one processor is configured to perform the first beamsweep with a higher transmission power per subcarrier than the second beamsweep and a narrower bandwidth than the second beamsweep.

16. The apparatus of claim 1, wherein for the different transmission parameter, the at least one processor is configured to perform the first beamsweep with a different signal duration than the second beamsweep to cause the measurement of the second beamsweep to have the closer minimum required reception SNR to the first beamsweep.

17. The apparatus of claim 16, wherein for the different transmission parameter, the at least one processor is configured to perform the first beamsweep with a longer signal duration in a time domain than the second beamsweep.

18. The apparatus of claim 1, wherein the at least one processor is configured to perform the first beamsweep periodically and to perform the second beamsweep in response to detection of a target during the first beamsweep.

19. An apparatus for beam management for radio frequency (RF) sensing at a wireless device, comprising:
   memory; and
   at least one processor coupled to the memory and configured to:
      perform a first beamsweep of an RF signal;
      measure a reflection of the RF signal based on the first beamsweep;
      perform a second beamsweep of the RF signal, wherein the first beamsweep is based on a different parameter than the second beamsweep, and wherein at least one of the first beamsweep or the second beamsweep is based on frequency division multiplexing with a frequency for wireless communication;
      measure the reflection of the RF signal based on the second beamsweep; and select a beam for RF sensing based on the first beamsweep and the second beamsweep.

20. The apparatus of claim 19, the at least one processor is configured to perform the at least one of the first beamsweep or the second beamsweep by scanning a set of beams using a first frequency that is different than a second frequency for the wireless communication.

21. The apparatus of claim 20, wherein the at least one processor is configured to perform two consecutive sensing sweeps separated by a non-zero gap and overlapping in time with the wireless communication.

22. The apparatus of claim 20, wherein the at least one processor is configured to perform two consecutive sensing sweeps separated by a non-zero gap and not overlapping in time with the wireless communication.

23. The apparatus of claim 20, wherein the at least one processor is configured to perform two consecutive sensing sweeps separated by a zero gap and overlapping in time with the wireless communication.

24. An apparatus for beam management for radio frequency (RF) sensing at a wireless device, comprising:
   memory; and
   at least one processor coupled to the memory and configured to:
      perform a first beamsweep of an RF signal periodically;
      measure a reflection of the RF signal based on the first beamsweep;
      perform a second beamsweep of the RF signal in response to detection of a target during the first beamsweep, wherein the first beamsweep is based on a different parameter than the second beamsweep, and wherein the first beamsweep uses a first carrier and the second beamsweep uses the first carrier;
      measure the reflection of the RF signal based on the second beamsweep; and
      select a beam for RF sensing based on the first beamsweep and the second beamsweep.

25. An apparatus for beam management for radio frequency (RF) sensing at a wireless device, comprising:
   memory; and
   at least one processor coupled to the memory and configured to:
      perform a first beamsweep of an RF signal periodically;
      measure a reflection of the RF signal based on the first beamsweep;
      perform a second beamsweep of the RF signal in response to detection of a target during the first beamsweep, wherein the first beamsweep is based on a different parameter than the second beamsweep, and wherein the first beamsweep uses a first carrier and the second beamsweep uses a second carrier;
      measure the reflection of the RF signal based on the second beamsweep; and
      select a beam for RF sensing based on the first beamsweep and the second beamsweep.

26. The apparatus of claim 25, wherein the second carrier used to perform the second beamsweep is a same carrier as the second carrier used for communication.

27. A method of beam management for radio frequency (RF) sensing at a wireless device, comprising:
   performing a first beamsweep of an RF signal;
   measuring a reflection of the RF signal based on the first beamsweep;
   performing a second beamsweep of the RF signal using at least one different parameter than used for the first beamsweep, wherein the first beamsweep is further based on a different transmission parameter than the second beamsweep, wherein the different transmission parameter causes a measurement of the second beamsweep to have a closer minimum required reception signal to noise ratio (SNR) to the first beamsweep;
   measuring the reflection of the RF signal based on the second beamsweep; and
   selecting a beam for RF sensing based on the first beamsweep and the second beamsweep.

28. The method of claim 27, further comprising:
   transmitting the RF signal with the selected beam; and
   performing the RF sensing of the reflection of the RF signal using the selected beam.

29. The method of claim 27, wherein the first beamsweep is performed over a region or a set of beams, the method further comprising:
   selecting a portion of the region based on measurements of the reflection of the RF signal over the first beamsweep, wherein the second beamsweep is performed over the portion of the region, wherein use of the portion of the region corresponds to the at least one different parameter for the second beamsweep; or
   selecting a subset of beams based on the measurements of the reflection of the RF signal over the first beamsweep, wherein the second beamsweep is performed over the subset of beams, wherein use of the subset of beams corresponds to the at least one different parameter for the second beamsweep.

30. The method of claim 27, wherein the at least one different parameter for the second beamsweep includes one or more of:
   a different range than the first beamsweep,
   a different range resolution than the first beamsweep,
   a portion of a region of the first beamsweep,
   a subset of beams of the first beamsweep,
   a different beam width than the first beamsweep, or
   a different bandwidth than the first beamsweep,
and wherein the different transmission parameter to cause the measurement of the second beamsweep to have the closer minimum required reception SNR to the first beamsweep includes one or more of:
   a different transmission power,
   the different transmission power per subcarrier, or
   a different signal duration.

* * * * *